(12) United States Patent
Hori

(10) Patent No.: US 10,015,356 B2
(45) Date of Patent: Jul. 3, 2018

(54) INFORMATION PROCESSING SYSTEM AND INFORMATION PROCESSING METHOD

(71) Applicant: Seijiro Hori, Tokyo (JP)

(72) Inventor: Seijiro Hori, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 14/475,635

(22) Filed: Sep. 3, 2014

(65) Prior Publication Data

US 2015/0077776 A1    Mar. 19, 2015

(30) Foreign Application Priority Data

Sep. 17, 2013 (JP) ................................. 2013-191379

(51) Int. Cl.
*H04N 1/32* (2006.01)

(52) U.S. Cl.
CPC ....... *H04N 1/3255* (2013.01); *H04N 1/32502* (2013.01)

(58) Field of Classification Search
None
See application file for complete search history.

(56) References Cited

U.S. PATENT DOCUMENTS

| | | | |
|---|---|---|---|
| 7,477,412 B2 * | 1/2009 | Miwa | G06F 3/1212 358/1.15 |
| 8,095,934 B2 | 1/2012 | Omori | |
| 8,411,300 B2 | 4/2013 | Sawayanagi et al. | |
| 8,601,478 B2 | 12/2013 | Yoshida | |
| 8,819,780 B2 | 8/2014 | Inose | |
| 2004/0004741 A1 | 1/2004 | Ozawa et al. | |

(Continued)

FOREIGN PATENT DOCUMENTS

| | | |
|---|---|---|
| CN | 1453717 A | 11/2003 |
| JP | 2005-271264 A | 10/2005 |

(Continued)

OTHER PUBLICATIONS

Japanese Office Action dated Jun. 27, 2017.
Chinese Office Action and english translation thereof dated Apr. 6, 2017.

*Primary Examiner* — John Wallace
(74) *Attorney, Agent, or Firm* — Harness, Dickey & Pierce, P.L.C.

(57) ABSTRACT

An information processing system comprising: a plurality of information processing apparatuses that perform a plurality of tasks defined by work flow information, wherein the work flow information is information that defines an order of the tasks and defines an information processing apparatus that assumes a host device for performing each of the tasks, one information processing apparatus selected from among the information processing apparatuses is definable as the host device, the information processing apparatus defined as the host device performs each of the tasks defined in the work flow information in the defined order, and one information processing apparatus selected according to a predetermined determination condition performs a task for which the work flow information defines the one information processing apparatus selected from among the information processing apparatuses as the host device.

18 Claims, 17 Drawing Sheets

(56) References Cited

U.S. PATENT DOCUMENTS

| | | | |
|---|---|---|---|
| 2005/0102442 A1* | 5/2005 | Ferlitsch | G06F 3/1204 |
| | | | 710/15 |
| 2005/0213116 A1 | 9/2005 | Uejo | |
| 2005/0213144 A1 | 9/2005 | Uejo | |
| 2005/0243365 A1* | 11/2005 | Noda | G06F 3/1262 |
| | | | 358/1.15 |
| 2006/0197977 A1* | 9/2006 | Miyata | G06F 3/1204 |
| | | | 358/1.15 |
| 2007/0130566 A1* | 6/2007 | van Rietschote | G06F 9/45533 |
| | | | 718/1 |
| 2008/0002220 A1* | 1/2008 | Song | H04N 1/00222 |
| | | | 358/1.15 |
| 2008/0229306 A1 | 9/2008 | Omori | |
| 2008/0285073 A1 | 11/2008 | Sawayanagi et al. | |
| 2009/0055903 A1 | 2/2009 | Inose | |
| 2009/0282417 A1 | 11/2009 | Yoshida | |
| 2011/0255124 A1* | 10/2011 | Klassen | G06F 3/121 |
| | | | 358/1.15 |
| 2012/0005378 A1* | 1/2012 | Abe | G06F 13/102 |
| | | | 710/18 |

FOREIGN PATENT DOCUMENTS

| | | |
|---|---|---|
| JP | 2005-275728 A | 10/2005 |
| JP | 2006-197409 A | 7/2006 |
| JP | 2008-065580 A | 3/2008 |
| JP | 2008-226182 A | 9/2008 |
| JP | 2008-287608 A | 11/2008 |
| JP | 2009-053762 A | 3/2009 |
| JP | 2009-140401 | 6/2009 |
| JP | 2009-272990 A | 11/2009 |
| JP | 2009-276851 A | 11/2009 |

\* cited by examiner

FIG.6

| TASK | INFORMATION PROCESSING APPARATUS | MACHINE ID |
|---|---|---|
| SCAN DOCUMENT | MULTIFUNCTION PERIPHERAL | 001 |
| OCR | MULTIFUNCTION PERIPHERAL WORK FLOW SERVER | 001 002 |
| PREPARE PDF FILE | WORK FLOW SERVER | 002 |
| SEND E-MAIL | WORK FLOW SERVER | 002 |

FIG.7

| NAME | IP ADDRESS | AUTHENTICATION INFORMATION |
|---|---|---|
| MULTIFUNCTION PERIPHERAL | 1.1.1.1 | USER NAME, PASSWORD |
| WORK FLOW SERVER | 1.1.1.2 | ADMINISTRATOR PASSWORD |

FIG.18

```
LOG IN

USER NAME  [          ]

PASSWORD   [          ]

```
SELECT WORK FLOW

[ WORK FLOW 1 ]   [ DETAILS ]

[ WORK FLOW 2 ]   [ DETAILS ]

[ WORK FLOW 3 ]   [ DETAILS ]

[ OK ]
```

INFORMATION PROCESSING SYSTEM AND INFORMATION PROCESSING METHOD

CROSS-REFERENCE TO RELATED APPLICATIONS

The present application claims priority to and incorporates by reference the entire contents of Japanese Patent Application No. 2013-191379 filed in Japan on Sep. 17, 2013.

BACKGROUND OF THE INVENTION

1. Field of the Invention

The present invention relates to an information processing system and an information processing method, each performing a plurality of tasks.

2. Description of the Related Art

Conventional multifunction peripherals having functions of, for example, printers, scanners, and facsimiles are capable of performing, on image data captured by, for example, a scanner, a work flow that defines in advance specific steps of a plurality of tasks (see, for example, Japanese Patent Application Laid-open No. 2009-140401). By defining the work flow, the multifunction peripheral can automatically transmit the captured image data to a specified folder or automatically send the captured image data by e-mail.

A known system causes a server to perform a work flow. In this system, a multifunction peripheral transmits captured image data to the server which, in turn, performs a plurality of tasks defined by the work flow. Such a system allows a work flow that may include tasks that the multifunction peripheral may find difficulty in performing (e.g., image correction and character recognition tasks) to be performed.

Hitherto, either the multifunction peripheral or the server performs the work flow. However, the recent improvement made on the functions of the multifunction peripheral enables relatively heavily loaded tasks to be performed. Thus, a need exists to allow the multifunction peripheral and the server to flexibly cooperate with each other to thereby perform the work flow efficiently.

In view of the foregoing situation, there is a need to provide an information processing system and an information processing method that cause a plurality of information processing apparatuses to cooperate and efficiently perform a plurality of tasks defined by work flow information.

SUMMARY OF THE INVENTION

It is an object of the present invention to at least partially solve the problems in the conventional technology.

According to the present invention, there is provided an information processing system comprising: a plurality of information processing apparatuses that perform a plurality of tasks defined by work flow information, wherein the work flow information is information that defines an order of the tasks and defines an information processing apparatus that assumes a host device for performing each of the tasks, one information processing apparatus selected from among the information processing apparatuses is definable as the host device, the information processing apparatus defined as the host device performs each of the tasks defined in the work flow information in the defined order, and one information processing apparatus selected according to a predetermined determination condition performs a task for which the work flow information defines the one information processing apparatus selected from among the information processing apparatuses as the host device.

The present invention also provides an information processing method implemented by an information processing system including a plurality of information processing apparatuses that perform a plurality of tasks defined by work flow information, wherein the work flow information is information that defines an order of the tasks and defines an information processing apparatus that assumes a host device for performing each of the tasks, and one information processing apparatus selected from among the information processing apparatuses is definable as the host device, the tasks defined in the work flow information is each performed in the defined order by the information processing apparatus defined as the host device, and by one information processing apparatus selected according to a predetermined determination condition, performed a task for which the work flow information defines the one information processing apparatus selected from among the information processing apparatuses as the host device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an exemplary device list table;

FIG. 7 is a diagram illustrating exemplary connection information;

FIG. 18 is a diagram illustrating an exemplary login screen;

FIG. 19 is a diagram illustrating an exemplary screen for selecting a work flow;

DETAILED DESCRIPTION OF THE PREFERRED EMBODIMENT

An embodiment of the present invention will be described in detail below with reference to the accompanying drawings. It is understood that the embodiment is not intended to limit the scope of the present invention.

Figure 1:
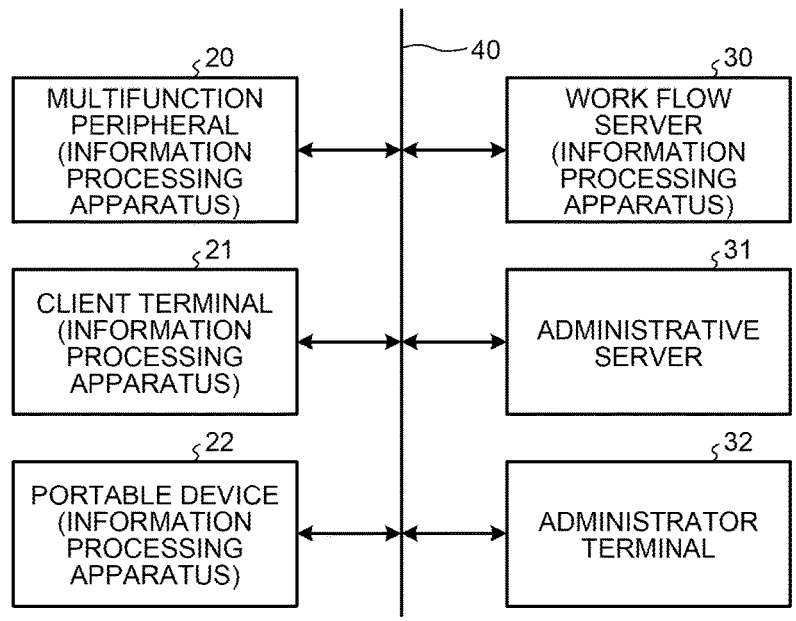
FIG. 1 is a diagram illustrating a configuration of an information processing system according to an embodiment of the present invention.

FIG. 1 illustrates a configuration of an information processing system 10 according to an embodiment of the present invention. The information processing system 10 exemplarily includes a multifunction peripheral 20, a client terminal 21, a portable device 22, a work flow server 30, an administrative server 31, and an administrator terminal 32.

The multifunction peripheral 20, the client terminal 21, the portable device 22, the work flow server 30, the administrative server 31, and the administrator terminal 32 are connected to each other via a network 40. The network 40 may be a local area network (LAN) or a wide area network (WAN) connecting the LAN via a router. The network 40 may include, for example, the Internet or a telephone line. The network 40 may be hardwired or part or all thereof may even be configured wirelessly.

The multifunction peripheral 20 has at least one of a scanner function, a printer function, and a facsimile function. The multifunction peripheral 20 also has, for example, a communication function, a display function, and an input function. In addition, the multifunction peripheral 20 functions as an information processing apparatus that stores therein a program in advance and performs data processing according to the stored program. Exemplarily, the multifunction peripheral 20 scans a sheet to thereby capture image data and perform data processing according to the program for the captured image data.

The client terminal 21 is, for example, a desktop computer, a notebook computer, a workstation, and a videoconference terminal. The client terminal 21 has, for example, a communication function, a display function, and an input function. In addition, the client terminal 21 functions as an information processing apparatus that stores therein a program in advance and performs data processing according to the stored program.

The portable device 22 is a device carried by a user, such as a smartphone, a tablet terminal, a mobile phone, and a digital camera. The portable device 22 has, for example, a communication function, a display function, and an input function. In addition, the portable device 22 functions as an information processing apparatus that stores therein a program in advance and performs data processing according to the stored program.

The multifunction peripheral 20, the client terminal 21, and the portable device 22 are each an exemplary information processing apparatus capable of requesting to perform a work flow relative to the work flow server 30. The information processing system 10 may include any information processing apparatus other than the multifunction peripheral 20, the client terminal 21, and the portable device 22.

The work flow server 30 comprises one or more computers. The work flow server 30 has a communication function and stores therein a program in advance, thus functioning as an information processing apparatus performing data processing according to the stored program.

The work flow server 30 stores therein work flow information in advance. The work flow information defines an order in which a plurality of tasks are to be performed and a specific information processing apparatus that assumes a host device performing a corresponding one of the tasks for each task. Additionally, the work flow information can define a specific information processing apparatus selected from among information processing apparatuses as the host device. It is noted that the information processing apparatuses that assume the host device include the work flow server 30 and the information processing apparatuses that request the work flow server 30 to perform the work flow over the network 40 (e.g., the multifunction peripheral 20, the client terminal 21, and the portable device 22).

The work flow server 30 provides to the information processing apparatus (the multifunction peripheral 20, the client terminal 21, or the portable device 22) that requests performance of the work flow, with the requested work flow information. The work flow server 30 cooperates with the information processing apparatus that requests the performance of the work flow to perform the tasks defined in the work flow information. More specifically, the work flow server 30 and the information processing apparatus that requests the performance of the work flow cause the information processing apparatus defined as the host device to perform each of the tasks defined in the work flow information in the defined order. If the host devices are changed in this case, the work flow server 30 and the information processing apparatus that requests the performance of the work flow transfer and receive the data to be processed via the network 40.

In addition, if the work flow information defines that a specific task is to be performed by a host device that is one information processing apparatus selected from among the information processing apparatuses, the work flow server 30 and the information processing apparatus that requests the performance of the work flow cause one information processing apparatus selected according to a predetermined determination condition to perform the specific task.

The administrative server 31 comprises one or more computers. The administrator terminal 32 is a computer operated by an administrator. The administrative server 31 and the administrator terminal 32 prepare the work flow information according to an operation performed by the administrator and register the work flow information in the work flow server 30. The administrative server 31 may be configured integrally with the work flow server 30.

The information processing system 10, as configured as described above, causes the work flow server 30, and the multifunction peripheral 20, the client terminal 21, or the portable device 22 provided with the work flow information to cooperate with each other to thereby perform the tasks defined in the work flow information.

The following exemplarily describes a case in which the work flow server 30 and the multifunction peripheral 20 cooperate with each other to thereby perform the tasks.

Figure 2:
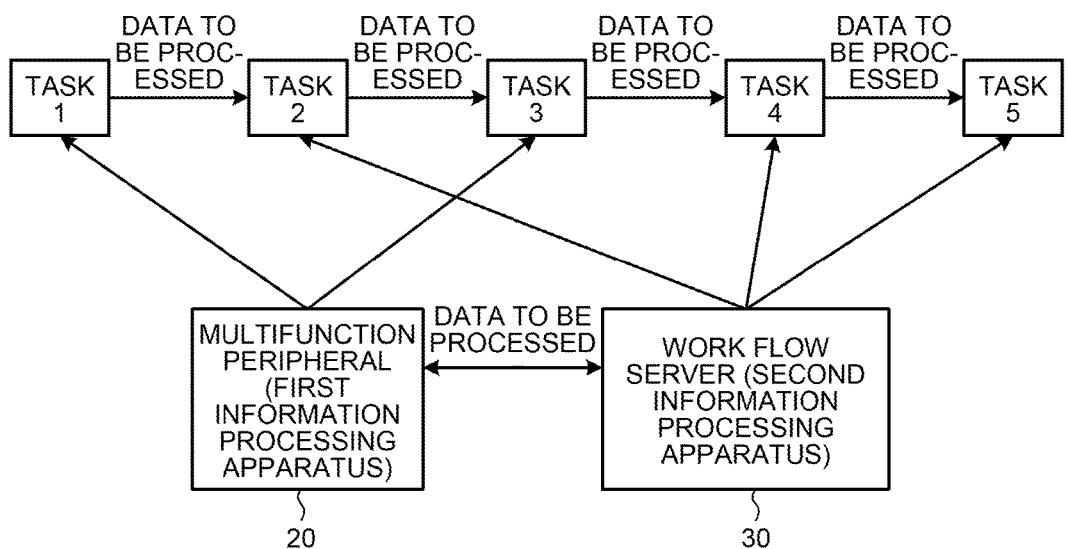
FIG. 2 is a diagram illustrating a correspondence between a plurality of tasks performed by the information processing system and a specific information processing apparatus assuming a host device that performs the tasks.

FIG. 2 is a diagram illustrating a correspondence between the tasks performed by the information processing system 10 and a specific information processing apparatus assuming the host device that performs the tasks. The work flow information defines details of each of the tasks, the order in which the tasks are performed, and the information processing apparatus assuming the host device for performing each of the tasks.

The work flow information may exemplarily define tasks for capturing data (e.g., a scan task, an imaging task, an e-mail reception task, and a facsimile reception task). The work flow information may exemplarily define various types of data processing tasks (e.g., a data compression task, a character recognition task (OCR task), a filtering task, a data synthesis task, a task for encoding data to a specific data format, and a task for converting data to a specific file format (e.g., preparing a PDF file). Alternatively, the work flow information may exemplarily define tasks for outputting data to an external environment (e.g., printing, displaying, voice output, uploading data to a server, and delivering e-mail).

The work flow information also defines the order in which the tasks are performed. The information processing apparatus that performs each task receives data to be processed that represents a result of a preceding task and performs the task relative to the received data to be processed. The data to be processed may be of any type, including image data, moving-image data, text data, voice data, and a computer program.

The work flow information defines the information processing apparatus that assumes the host device for performing each task. Assume, for example, a case in which the multifunction peripheral 20 and the work flow server 30 cooperate with each other to perform a plurality of tasks. In this case, the work flow information defines, for each task, either the multifunction peripheral 20 or the work flow server 30 as the host device that performs the task.

In addition, the work flow information may define as the host device one information processing apparatus selected according to a predetermined determination condition. For example, when the multifunction peripheral 20 and the work flow server 30 cooperate with each other to perform a plurality of tasks, the work flow information may define as the host device either the multifunction peripheral 20 or the work flow server 30 selected according to the predetermined determination condition. If such a definition is made, the specific information processing apparatus to act as the host device is selected from the multifunction peripheral 20 and the work flow server 30 according to the predetermined determination condition, prior to the performance of the task in question. The selected information processing apparatus then performs the task in question.

If the host devices are changed from that for a preceding task, the information processing apparatuses that perform the tasks according to the work flow information cause a first information processing apparatus as the host device for the preceding task to transmit the data to be processed as the result of the preceding task to a second information processing apparatus. For example, when the host devices are changed from the multifunction peripheral 20 to the work flow server 30, or vice versa, the first one of the multifunction peripheral 20 and the work flow server 30 passes the data to be processed (the result of the preceding task) to the second one via the network 40. This allows the multifunction peripheral 20 and the work flow server 30 to cooperate with each other and perform the tasks defined in the work flow information.

The work flow information is described in a computer-interpretable data format. The work flow information is exemplarily described in the extensible markup language (XML).

Figure 3:
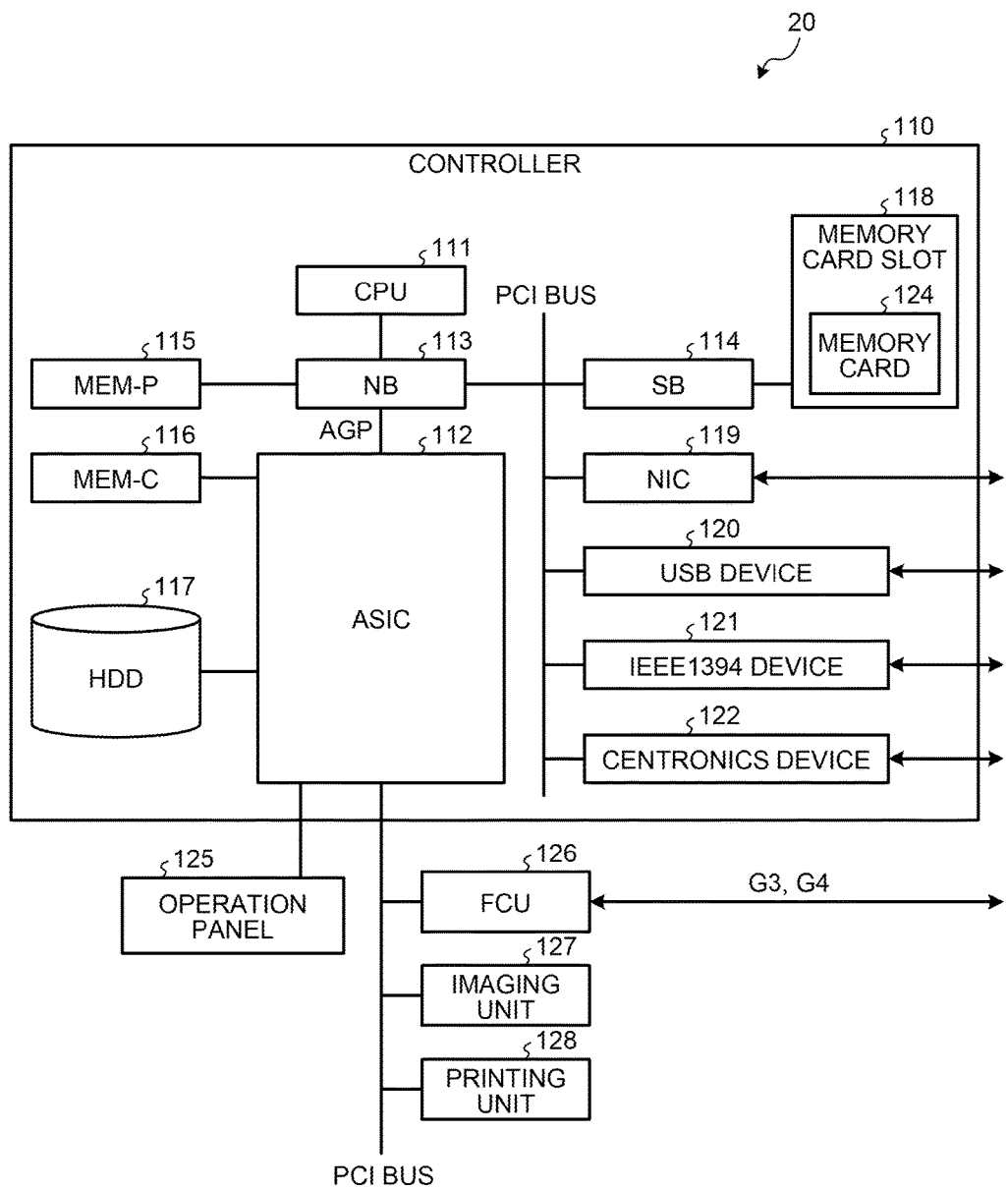
FIG. 3 is a diagram illustrating an exemplary hardware configuration of a multifunction peripheral.

FIG. 3 illustrates an exemplary hardware configuration of the multifunction peripheral 20. The multifunction peripheral 20 exemplarily includes a controller 110, an operation panel 125, a facsimile control unit (FCU) 126, an imaging unit 127, and a printing unit 128.

The controller 110 includes a central processing unit (CPU) 111, an application specific integrated circuit (ASIC) 112, a north bridge (NB) 113, a south bridge (SB) 114, a system memory (MEM-P) 115, a local memory (MEM-C) 116, a hard disk drive (HDD) 117, a memory card slot 118, a network interface controller (NIC) 119, a USB device 120, an IEEE1394 device 121, and a Centronics device 122.

The CPU 111 is an IC that performs various types of information processing, executing an application concurrently by the process on an operating system (OS) or a platform. The ASIC 112 is a semiconductor device for image processing. The NB 113 is a bridge for connecting the CPU 111 to the ASIC 112. The SB 114 is a bridge for connecting the NB 113 to, for example, a peripheral device. The ASIC 112 and the NB 113 are connected to each other via, for example, an accelerated graphics port (AGP).

The MEM-P 115 is a memory connected to the NB 113. The MEM-C 116 is a memory connected to the ASIC 112. The HDD 117 is a storage connected to the ASIC 112. The HDD 117 is used for, for example, storing image data, document data, programs, font data, and form data.

The HDD 117 stores therein various types of application programs (e.g., a copy program, a scanner program, a printer program, and a fax program). The HDD 117 also stores therein various types of plug-in programs. The plug-in programs allow various tasks defined in the work flow information to be performed. These programs are available as installable or executable files. The HDD 117 further stores therein a work flow processing program. The work flow processing program analyzes the work flow information and calls up a necessary plug-in program to thereby enable the task according to the work flow information to be performed.

The memory card slot 118 is connected to the SB 114 and used for inserting a memory card 124 therein. The memory card 124 is a flash memory, such as an USB memory, used for distributing the work flow processing program and the plug-in program. The work flow processing program and the plug-in program may also be distributed by downloading the program from a predetermined server to the multifunction peripheral 20.

The NIC 119 is a controller for performing data communications using, for example, a MAC address via, for example, the network 40. The USB device 120 provides a serial port that conforms to the universal serial bus (USB) standard. The IEEE1394 device 121 provides a serial port that conforms to the IEEE1394 standard. The Centronics device 122 provides a parallel port that conforms to the Centronics standard. The NIC 119, the USB device 120, the IEEE1394 device 121, and the Centronics device 122 are connected to the NB 113 and the SB 114 via a peripheral component interconnect (PCI) bus.

The operation panel 125 is hardware (an operating unit) for a user to input data to the multifunction peripheral 20. The operation panel 125 is also hardware (a display unit) for the multifunction peripheral 20 to display a menu screen. The operation panel 125 is connected to the ASIC 112. The FCU 126, the imaging unit 127, and the printing unit 128 are connected to the ASIC 112 via a PCI bus.

The imaging unit 127 optically scans a document placed on a contact glass, subjects light reflected off the document to A/D conversion to perform image processing, and thereby generates color or monochrome image data.

The printing unit 128 includes, for example, a tandem type photoconductor drum. The printing unit 128 forms a latent image by modulating a laser beam and scanning the photoconductor drum based on the image data or page description language (PDL) data received from, for example, the client terminal 21. The printing unit 128 then transfers page-by-page images through developing by causing toner to stick to the latent image onto a sheet by applying heat and pressure to the developed image. The printing unit 128 is not limited to a plotter using an electrophotographic method. For example, the printing unit 128 may be an inkjet type plotter engine that forms an image by ejecting liquid droplets.

The FCU 126 transmits and receives image data by connecting to the network 40 via the NIC 119 and according to a communication protocol conforming to, for example, a T.37 or a T.38 standard. The FCU 126 also transmits and receives image data by connecting to a public telecommunication network and according to a communication protocol conforming to, for example, a G3 or a G4 standard. Furthermore, even when image data is received when the multifunction peripheral 20 is turned off, the FCU 126 can start the printing unit 128 to thereby print the image data on a sheet.

Figure 4:
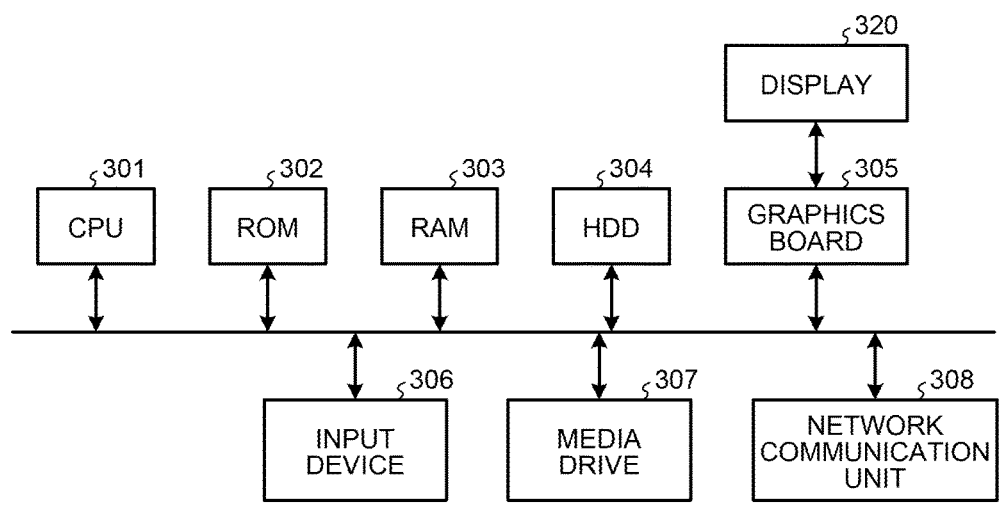
FIG. 4 is a diagram illustrating an exemplary hardware configuration of a work flow server, an administrative server, and an administrator terminal.

FIG. 4 is a diagram illustrating an exemplary hardware configuration of the work flow server 30, the administrative server 31, and the administrator terminal 32.

The work flow server 30, the administrative server 31, and the administrator terminal 32 each includes a CPU 301, a read only memory (ROM) 302, a random access memory (RAM) 303, a HDD 304, a graphics board 305 to which a display 320 is connected, an input device 306, a media drive 307, and a network communication unit 308. The CPU 301, the ROM 302, the RAM 303, the HDD 304, the graphics board 305, the input device 306, the media drive 307, and the network communication unit 308 are connected to each other by a bus.

The CPU 301 performs a computer program loaded from the HDD 304 onto the RAM 303 to thereby control different components, thereby inputting and outputting data and processing data. The ROM 302 stores therein a start program for reading the basic input/output system (BIOS) and a bootstrap loader from the HDD 304 onto the RAM 303. The bootstrap loader reads the OS from the HDD 304 onto the RAM 303.

The HDD 304 may, for example, be a solid state drive (SSD), as long as it is a nonvolatile memory. The HDD 304 stores therein the OS and device drivers. The HDD 304 also stores therein a work flow processing program. The HDD 304 further stores therein various types of plug-in programs. These programs are available as installable or executable files and distributed by being recorded in a computer-readable recording medium. The programs may instead be distributed by being downloaded from the server.

The display 320 displays a GUI screen prepared by the graphics board 305 as instructed by a program. The input device 306 may, for example, be a keyboard or a mouse, accepting an operation performed by the user. The media drive 307 reads and writes data from/to a compact disc, a digital versatile disc (DVD), a Blu-ray disc, and other optical discs. The media drive 307 may read and write data from/to a memory card such as a flash memory. The network communication unit 308 is, for example, an Ethernet (registered trademark) card for connecting to a LAN.

Figure 5:
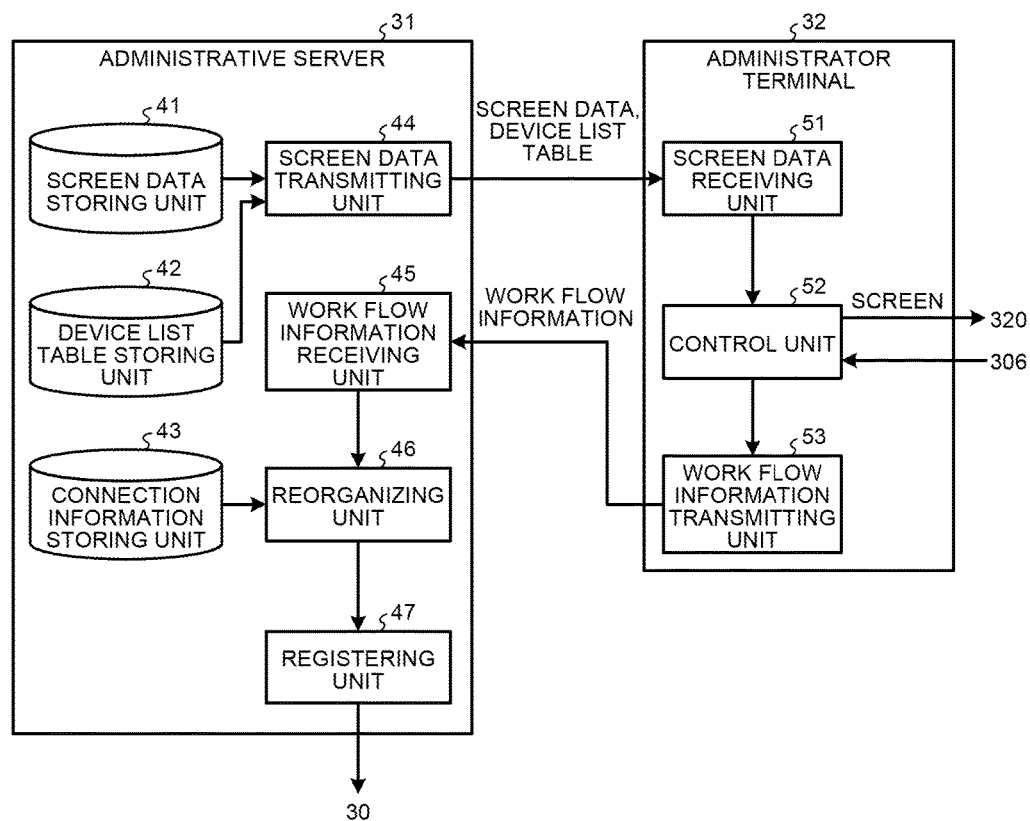
FIG. 5 is a diagram illustrating a functional configuration of the administrative server and the administrator terminal.

FIG. 5 illustrates a functional configuration of the administrative server 31 and the administrator terminal 32. FIG. 6 illustrates an exemplary device list table. FIG. 7 illustrates exemplary connection information.

The administrative server 31 includes a screen data storing unit 41, a device list table storing unit 42, a connection information storing unit 43, a screen data transmitting unit 44, a work flow information receiving unit 45, a reorganizing unit 46, and a registering unit 47. The screen data storing unit 41 stores therein screen data that appears on the administrator terminal 32 while the work flow information is being prepared.

The device list table storing unit 42 stores therein a device list table. The device list table is, as illustrated in FIG. 6, for example, a registered list of a plurality of tasks definable by the work flow information, each of the tasks being associated with at least one information processing apparatus that can assume the host device for the task in question and a machine ID assigned to the information processing apparatus. The machine ID is identification information assigned uniquely to each information processing apparatus.

The connection information storing unit 43 stores therein connection information required for connecting to each of the information processing apparatuses. The connection information is, as exemplarily illustrated in FIG. 7, a registered list of names of the information processing apparatuses, each name of the information processing apparatus being associated with a network address (an IP address) and authentication information required for accessing the specific information processing apparatus in question (e.g., a user name and a password). The authentication information required for accessing the information processing apparatus may not need to be registered in advance. In this case, the information processing apparatus is accessed by using authentication information input by the user when the work flow is to be performed.

The screen data transmitting unit 44 transmits the screen data stored in the screen data storing unit 41 and the device list table stored in the device list table storing unit 42 to the administrator terminal 32. The work flow information receiving unit 45 receives the work flow information prepared according to the operation performed by the administrator from the administrator terminal 32.

The reorganizing unit 46 reorganizes the work flow information received by the work flow information receiving unit 45. More specifically, the reorganizing unit 46 analyzes the work flow information received by the work flow information receiving unit 45, detects a position at which the information processing apparatus that assumes the host device changes from a first one to a second one, and inserts a connection task at the detected position. In this case, the reorganizing unit 46 prepares the connection task based on the connection information stored in the connection information storing unit 43. The connection task inserting position will be further described with reference to FIGS. 14 and 15. Additionally, specific details of the connection task will be further described with reference to FIG. 20.

The registering unit 47 transmits the work flow information reorganized by the reorganizing unit 46 to the work flow server 30, and thereby registers the work flow information in the work flow server 30.

The administrator terminal 32 includes a screen data receiving unit 51, a control unit 52, and a work flow information transmitting unit 53. The screen data receiving unit 51 receives screen data from the administrative server 31.

The control unit 52 displays the screen data received by the screen data receiving unit 51 on the display 320. The control unit 52 prepares the work flow information according to information input by the input device 306. More specifically, the control unit 52 displays on the display 320 a screen for defining the order in which a plurality of tasks are performed and defining association between each of the tasks and a specific information processing apparatus that assumes the host device for the task. Then, in response to an operation input on the screen, the control unit 52 prepares the work flow information that defines the order in which the tasks are performed and a specific information processing apparatus that assumes the host device for each of the tasks. The work flow information transmitting unit 53 transmits the work flow information prepared by the control unit 52 to the administrative server 31.

Figure 8:
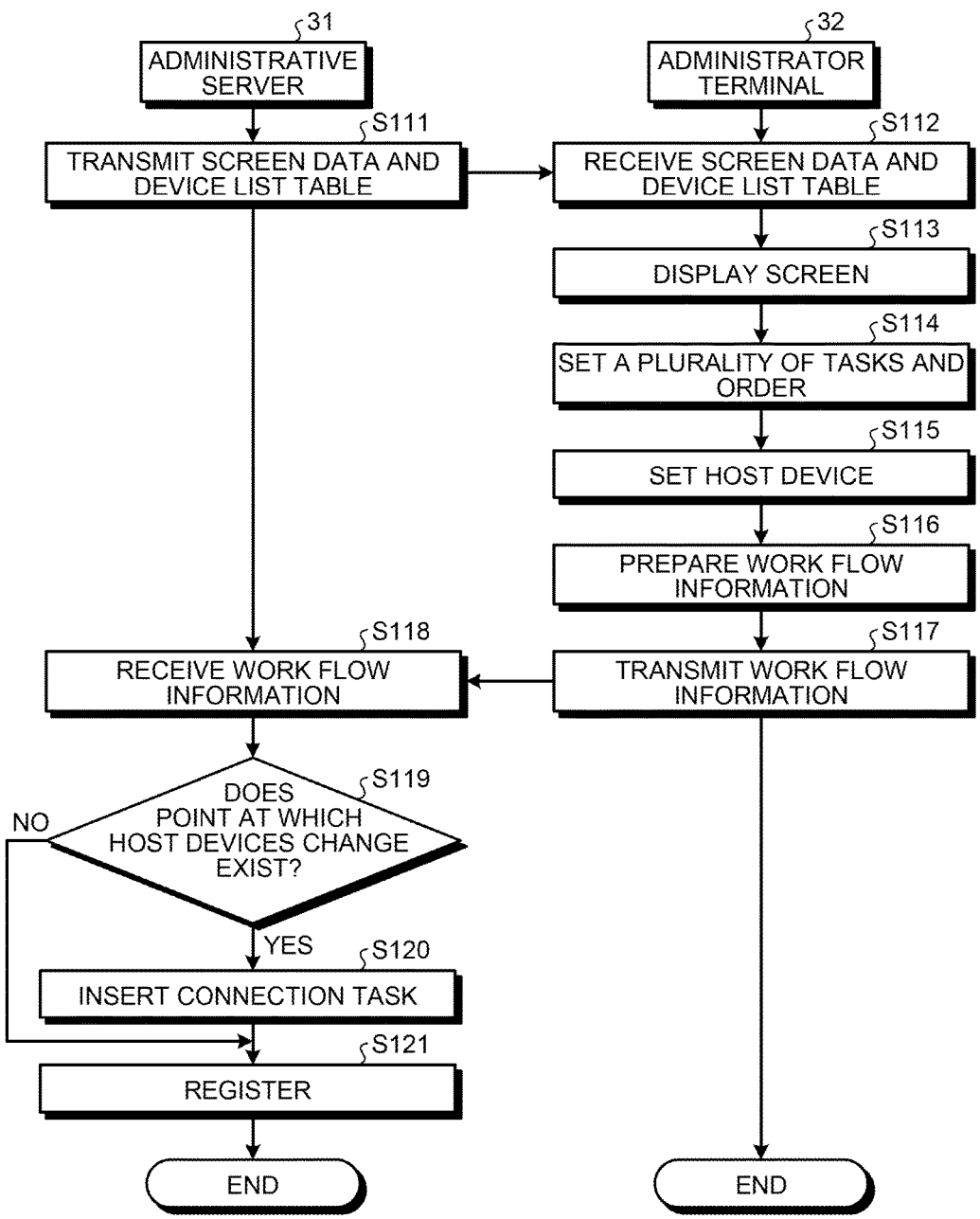
FIG. 8 is a flowchart illustrating a work flow information preparation process.

FIG. 8 is a flowchart illustrating a work flow information preparation process. The administrative server 31 and the administrator terminal 32 prepare the work flow information by following the steps given in the flowchart illustrated in FIG. 8.

In response to a request from the administrator terminal 32, for example, the administrative server 31 transmits screen data and a device list table to the administrator terminal 32 at step S111. Then, at step S112, the administrator terminal 32 receives the screen data and the device list table transmitted from the administrative server 31.

At step S113, the administrator terminal 32 displays a screen on the display 320. Then, at step S114, based on the operation performed on the screen by the administrator, the administrator terminal 32 sets the tasks and the order of performance of the tasks to be defined by the work flow information. At step S115, the administrator terminal 32 sets the host device for each of the set tasks. It is noted that the administrator terminal 32 may make the settings by repeatedly performing steps S114 and S115.

When the settings at steps S114 and S115 are validated, the administrator terminal 32 prepares, at step S116, the work flow information based on the settings made. Exemplarily, the administrator terminal 32 prepares as the work flow information an XML document that describes the order of the tasks and the host device for each of the tasks.

At step S117, the administrator terminal 32 transmits the prepared work flow information to the administrative server 31. Then, at step S118, the administrative server 31 receives the work flow information transmitted from the administrator terminal 32.

At step S119, the administrative server 31 analyzes the work flow information and determines whether a point at which the host device is changed (or a point at which the host devices are likely to change) exists. If the point does not exist (No at step S119), the administrative server 31 performs step S121. If the point exists (Yes at step S119), the administrative server 31 performs step S120.

At step S120, the administrative server 31 reorganizes the work flow information by inserting a connection task between tasks between which the host device is changed (or between tasks between which the host device is likely to be changed) in the tasks defined by the work flow information. The connection task involves a determination made as to whether or not the host devices are to change and performance of a communication task required for changing the host devices. The positions in which the connection task is to be inserted will be further described with reference to FIGS. 14 and 15. Specific details of the connection task will be further described with reference to FIG. 20.

Upon completing performing step S120, the administrative server 31 performs step S121. At step S121, the administrative server 31 transmits the reorganized work flow information to, and thereby registers the reorganized work flow information in, the work flow server 30.

FIGS. 9, 10, 11, 12, and 13 illustrate exemplary screens during preparation of the work flow information. At steps of S114 and S115 illustrated in FIG. 8, the administrator terminal 32 displays screens, for example, such as those illustrated in FIGS. 9 to 13, to thereby support the preparation of the work flow information.

The administrator terminal 32 displays, within the screen for supporting the preparation of the work flow information, a logic flow area 101, a physical flow area 102, a task list area 103, and a device list area 104.

The logic flow area 101 provides an area for the administrator to set the order of the tasks. The physical flow area 102 provides an area for setting the host device for the task set in the logic flow area 101. The logic flow area 101 and the physical flow area 102 are displayed vertically juxtaposed to each other. The logic flow area 101 is displayed on the upper side, while the physical flow area 102 is displayed on the lower side.

The task list area 103 provides an area for displaying task icons representing the tasks definable in the work flow information. The task icons are displayed so as to allow specific details of the tasks to be understood, such as a character recognition task and an e-mail delivery task.

The device list area 104 provides an area for displaying device icons representing the devices definable as the host devices for the tasks. The device list area 104 displays, for example, a device icon that represents the multifunction peripheral 20 and a device icon that represents the work flow server 30.

Additionally, the device list area 104 displays a device icon that represents a virtual device selected as the host device from among the two information processing apparatuses. In this case, the device list area 104 displays a device icon that represents a virtual autonomously selected device that assumes the host device for the task, either the multifunction peripheral 20 or the work flow server 30.

Figure 9:
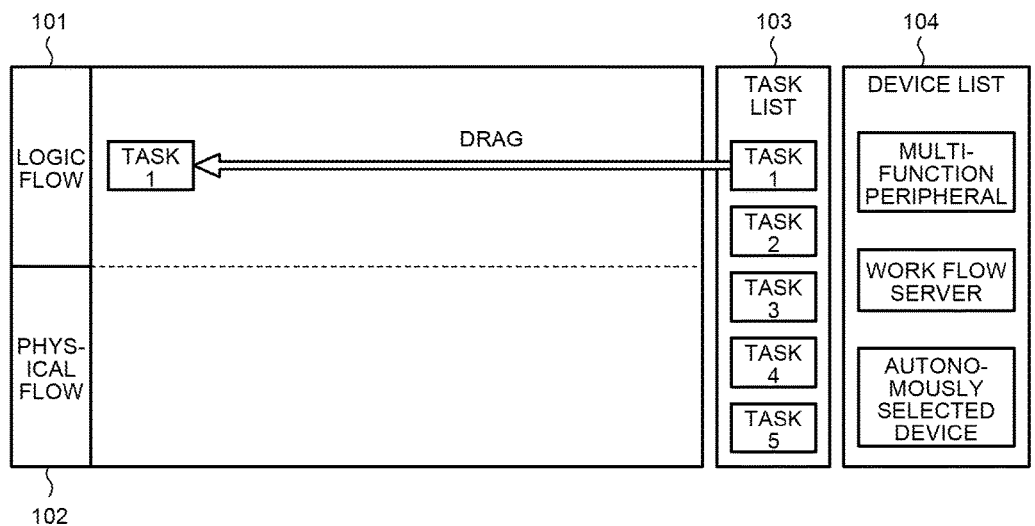
FIG. 9 is a diagram illustrating a first exemplary screen during preparation of the work flow information.

For example, as illustrated in FIG. 9, the administrator first operates the input device 306 of the administrator terminal 32 to select a task icon (e.g., task 1) displayed in the task list area 103, then dragging the task icon to the logic flow area 101. This disposes the selected task icon (task 1) in the logic flow area 101.

Figure 10:
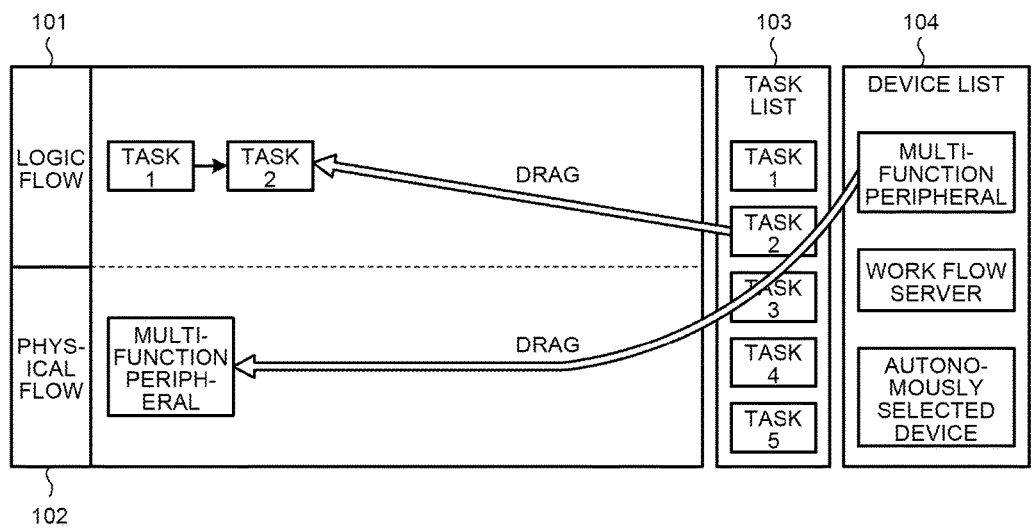
FIG. 10 is a diagram illustrating a second exemplary screen during preparation of the work flow information.

Next, as illustrated in FIG. 10, the administrator selects the task icon for the task to be next performed (task 2) and drags the task icon to the logic flow area 101. When two or more tasks are disposed in the logic flow area 101, the administrator terminal 32 connects the two task icons with an arrow indicating the order of performance. It is noted that the administrator terminal 32 may automatically determine the order of performance of the tasks based on the positions at which the task icons are disposed to thereby place an arrow as appropriate. Alternatively, the administrator terminal 32 may place the arrow according to the operation performed by the administrator.

As illustrated in FIG. 10, the administrator selects from the device list area 104 a device icon that represents the information processing apparatus to assume the host device for the task (e.g., a multifunction peripheral icon) and drags the device icon to the physical flow area 102. This disposes the selected device icon in the physical flow area 102.

Figure 11:
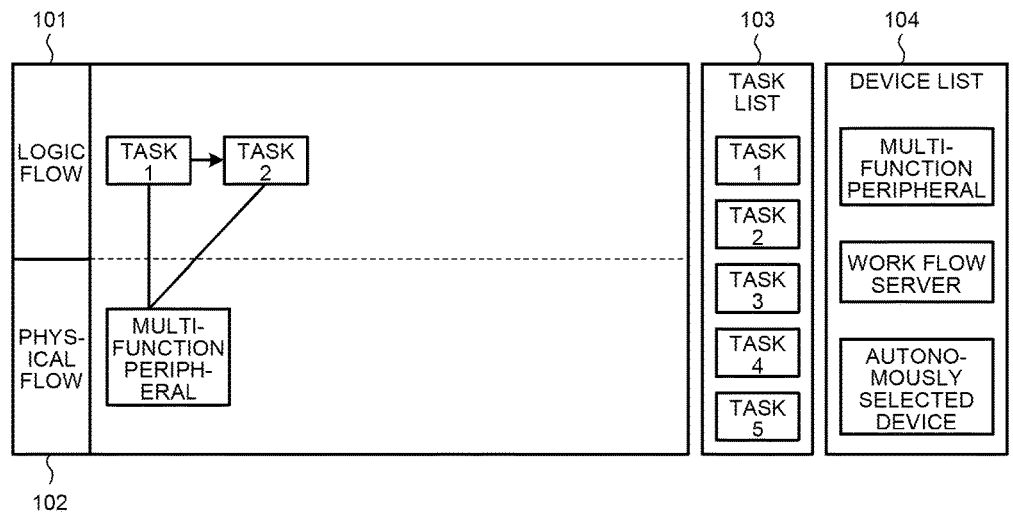
FIG. 11 is a diagram illustrating a third exemplary screen during preparation of the work flow information.

As illustrated in FIG. 11, the administrator performs an operation to associate the task icon disposed in the logic flow area 101 with the device icon disposed in the physical flow area 102. Through the foregoing operation, the administrator terminal 32 connects the task icon disposed in the logic flow area 101 with the device icon disposed in the physical flow area 102 with a line, to thereby associate the two with each other. If only one information processing apparatus can perform the task disposed in the logic flow area 101, the administrator terminal 32 may automatically dispose the device icon in the physical flow area 102 and connect the task icon and the device icon with a line.

Figure 12:
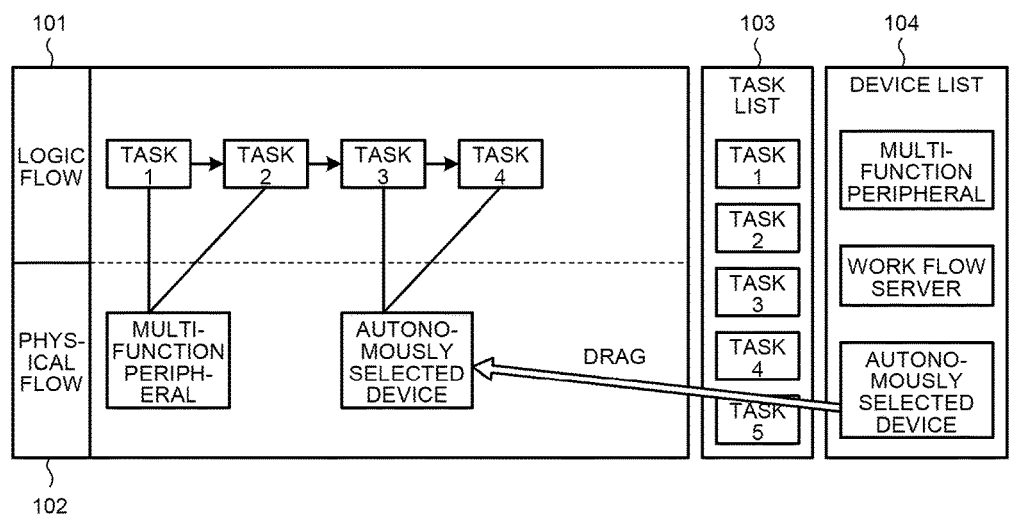
FIG. 12 is a diagram illustrating a fourth exemplary screen during preparation of the work flow information.

As illustrated in FIG. 12, the administrator may further drag task icons (e.g., task 3 and task 4) to the logic flow area 101. Additionally, the administrator may dispose the icon for the autonomously selected device (a virtual device indicating that either the multifunction peripheral 20 or the work flow server 30, whichever is selected to be the host device) in the physical flow area 102. The administrator terminal 32 may then connect the autonomously selected device icon with the task icons disposed in the logic flow area 101 with a line to thereby associate the task icons with the device icon.

Figure 13:
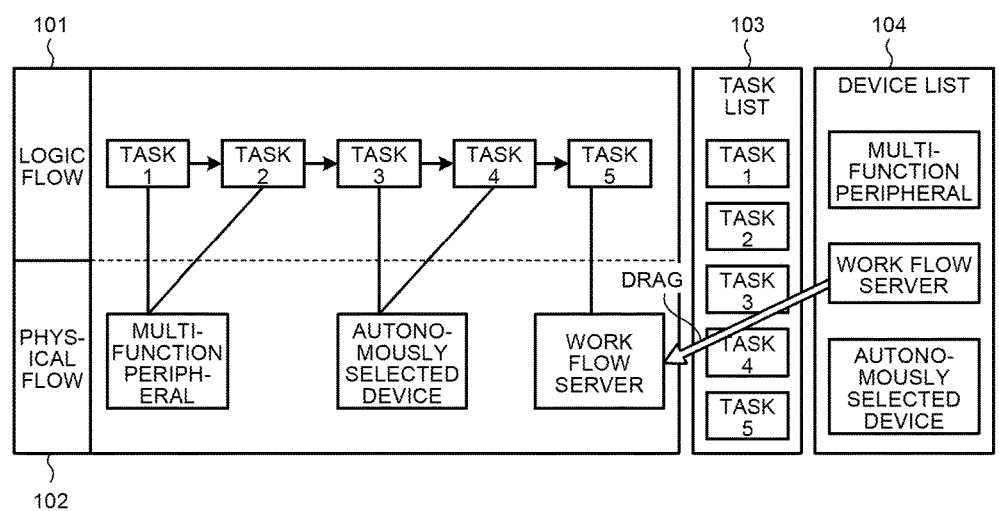
FIG. 13 is a diagram illustrating a fifth exemplary screen during preparation of the work flow information.

Assume that, as illustrated in FIG. 13, the task icons have been disposed in the logic flow area 101, the device icons have been disposed in the physical flow area 102, and the task icons and the device icons have been associated with each other. Then, the administrator terminal 32 analyzes information on the icons, arrows, and lines disposed in the logic flow area 101 and the physical flow area 102 to thereby prepare the work flow information.

More specifically, the administrator terminal 32 prepares the work flow information that defines that a plurality of tasks represented by the task icons disposed in the logic flow area 101 are performed in the order of the arrows connecting the tasks. In addition, the administrator terminal 32 prepares the work flow information that defines the information processing apparatus represented by the device icon connected by a line in the physical flow area 102 as the host device to perform a corresponding one of the tasks represented by the task icons disposed in the logic flow area 101. As such, the administrator terminal 32 can prepare the work flow information using a simple user interface.

Figure 14:
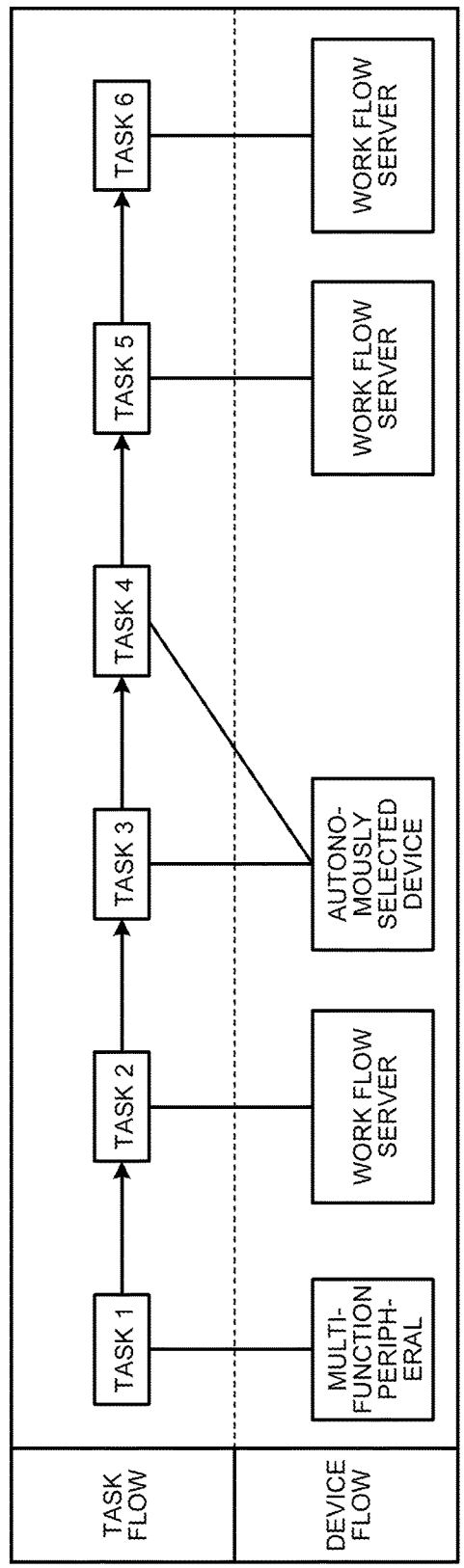
FIG. 14 is a diagram illustrating exemplary work flow information before connection tasks are inserted.
Figure 15:
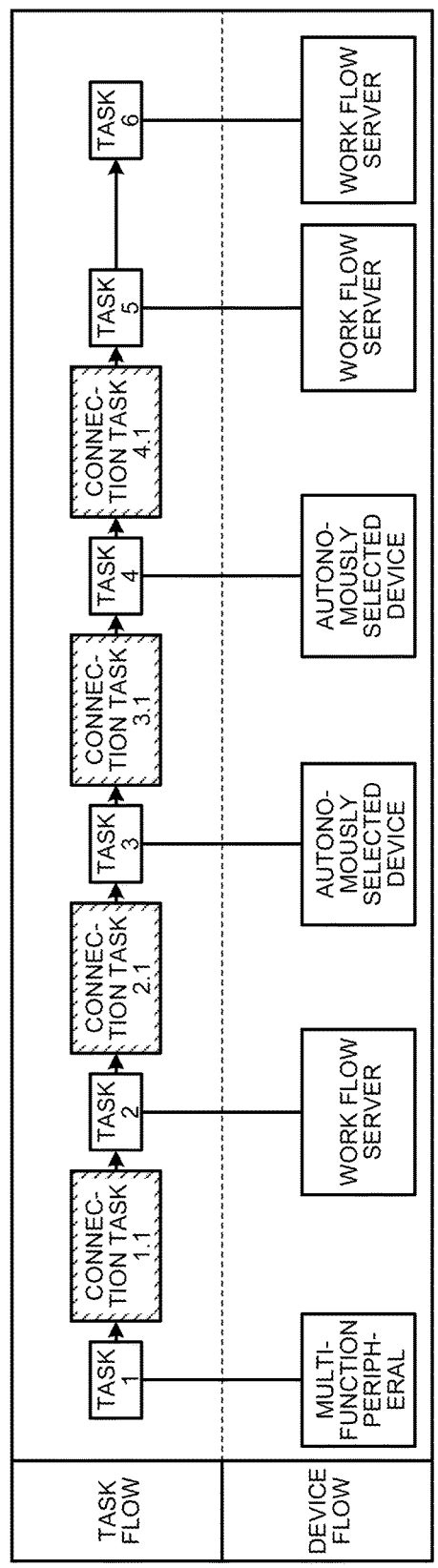
FIG. 15 is a diagram illustrating work flow information after the connection tasks are inserted in the work flow information illustrated in FIG. 14.

FIG. 14 illustrates exemplary work flow information before connection tasks are inserted. FIG. 15 illustrates work flow information after the connection tasks are inserted in the work flow information illustrated in FIG. 14.

The administrative server 31 receives from the administrator terminal 32 the work flow information prepared according to the operations performed by the administrator. Relative to the received work flow information, the administrative server 31 inserts a connection task in a position at which the information processing apparatuses as the host devices for the tasks change (or are likely to change).

For example, as illustrated in FIGS. 14 and 15, the administrative server 31 inserts connection task 1.1 between task 1 and task 2. Specifically, the administrative server 31 inserts the connection task between a task performed by a first information processing apparatus (in this case, the multifunction peripheral 20) as the host device and a task performed by a second information processing apparatus (in this case, the work flow server 30) as the host device. The insertion of the connection task in this position allows the first information processing apparatus (in this case, the multifunction peripheral 20) to transmit the data to be processed to the second information processing apparatus (in this case, the work flow server 30) between the two tasks to thereby set the second information processing apparatus as the host device for the subsequent task.

Alternatively, for example, as illustrated in FIGS. 14 and 15, the administrative server 31 inserts connection task 2.1 between task 2 and task 3. Specifically, the administrative server 31 inserts the connection task between a task performed by a first information processing apparatus (in this case, the work flow server 30) as the host device and a task performed by one information processing apparatus selected from the first information processing apparatus (in this case, the work flow server 30) and a second information processing apparatus (in this case, the multifunction peripheral 20) as the host device.

The insertion of the connection task in this position allows the first information processing apparatus (in this case, the work flow server 30) to select one information processing apparatus (in this case, either the multifunction peripheral 20 or the work flow server 30) selected from the first information processing apparatus and the second information processing apparatus according to a predetermined determination condition. If the host device for the subsequent task is a new one as a result of the selection, the first information processing apparatus (in this case, the work flow server 30) and the second information processing apparatus (in this case, the multifunction peripheral 20) transmit the data to be processed to the second information processing apparatus to thereby change the host device for the subsequent task to the second information processing apparatus. If the host device for the subsequent task remains unchanged as a result of the selection, the first information processing apparatus (in this case, the work flow server 30) can perform the subsequent task.

Alternatively, for example, as illustrated in FIGS. 14 and 15, the administrative server 31 inserts connection task 3.1 between task 3 and task 4. Specifically, when two or more tasks are consecutive, each of the tasks being performed by, as the host device, one information processing apparatus selected from a first information processing apparatus and a second information processing apparatus, the administrative server 31 inserts the connection task before each of the two or more consecutive tasks. The insertion of the connection task in this position allows the first information processing apparatus and the second information processing apparatus to select one information processing apparatus selected from the first information processing apparatus and the second information processing apparatus according to a predetermined determination condition.

If the host device for the subsequent task is a new one as a result of the selection, the first information processing apparatus and the second information processing apparatus transmit the data to be processed to the newly selected information processing apparatus to thereby change the host device for the subsequent task to the newly selected information processing apparatus. If the host device for the subsequent task remains unchanged as a result of the selection, the original information processing apparatus can perform the subsequent task.

When two or more tasks are consecutive, each of the tasks being performed by, as the host device, one information processing apparatus selected from a first information processing apparatus and a second information processing apparatus, the administrative server 31 may insert a connection task before a starting task. When the connection task is inserted in this position, the first information processing apparatus and the second information processing apparatus set the host device for all of the two or more consecutive tasks but the starting task identical to the host device for the starting task.

Still alternatively, for example, as illustrated in FIGS. 14 and 15, the administrative server 31 inserts connection task 4.1 between task 4 and task 5. Specifically, the administrative server 31 inserts the connection task between a task performed by one information processing apparatus selected from a first information processing apparatus and a second information processing apparatus as the host device and a task performed by a second information processing apparatus (in this case, the work flow server 30) as the host device. The insertion of the connection task in this position allows the first information processing apparatus and the second information processing apparatus to determine whether or not the host device is changed between the tasks.

If the host device for the subsequent task is a new one as a result of the determination, the first information processing apparatus transmits the data to be processed to the second information processing apparatus, so that the host device for the subsequent task can be changed to the selected information processing apparatus. If the host device for the subsequent task remains unchanged as a result of the determination, the second information processing apparatus can perform the subsequent task.

Figure 16:
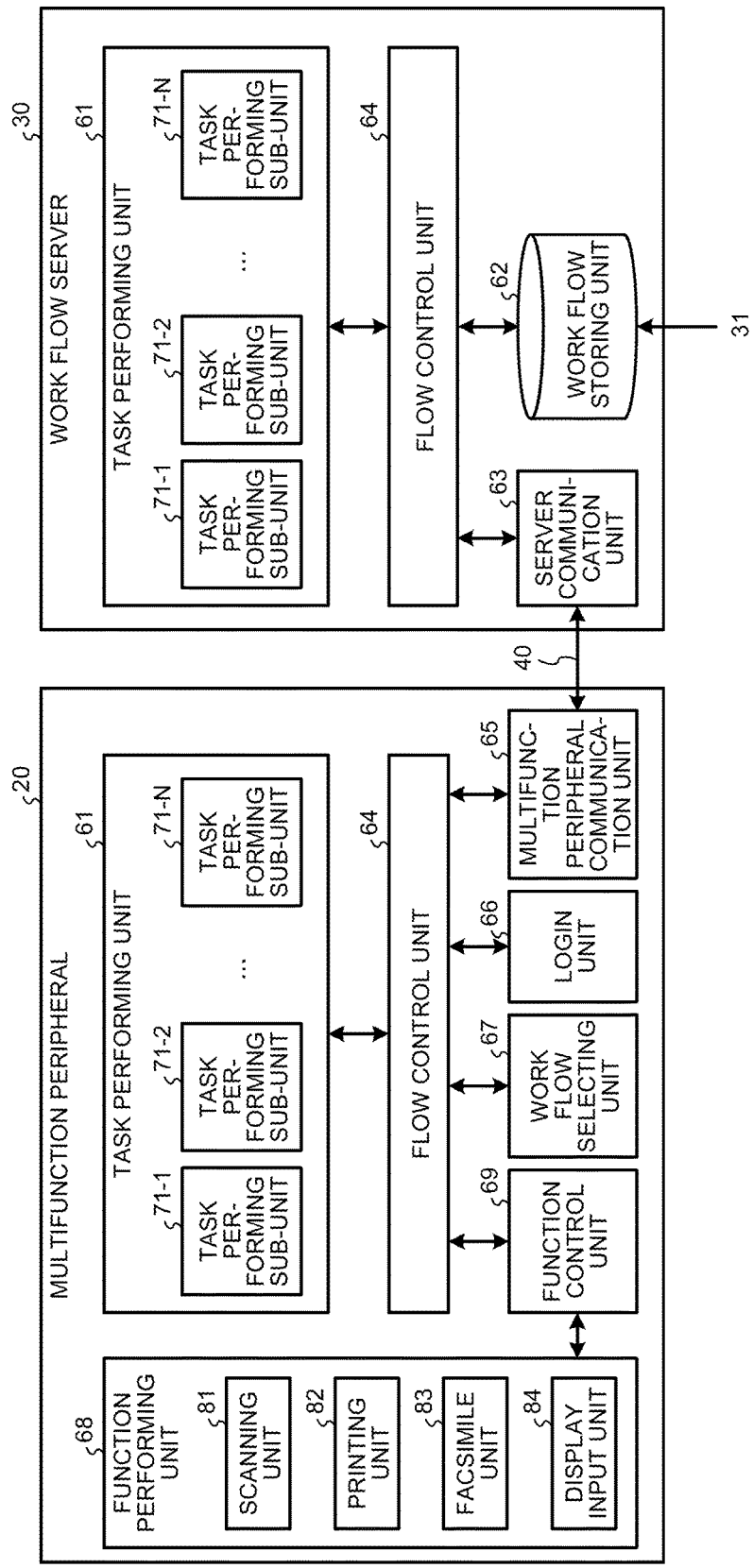
FIG. 16 is a diagram illustrating functional configurations of the multifunction peripheral and the work flow server.

FIG. 16 illustrates functional configurations of the multifunction peripheral 20 and the work flow server 30. The work flow server 30 includes a task performing unit 61, a work flow storing unit 62, a server communication unit 63, and a flow control unit 64.

The task performing unit 61 performs each of the tasks defined in the work flow information. The task performing unit 61 includes a plurality of task performing sub-units 71 (71-1, 71-2, . . . , 71-N). Each of the task performing sub-units 71 performs a unique task different from each other. The task performing sub-units 71 are each achieved by a processor performing a plug-in program called up by the flow control unit 64.

For example, the task performing unit 61 performs a character recognition task (OCR task) by the calling up of a character recognition plug-in program registered in advance. The task performing unit 61, for example, performs an e-mail delivery task by the calling up of an e-mail delivery plug-in program registered in advance. Additionally, for example, the task performing unit 61 performs a connection task to be described in detail with reference to FIG. 20 by the calling up of a connection task plug-in program registered in advance.

The work flow storing unit 62 stores therein at least one piece of work flow information registered from the administrative server 31. The server communication unit 63 communicates with, for example, the multifunction peripheral 20 and other information processing apparatuses via the network 40.

The flow control unit 64 accepts a selection of the work flow information from the multifunction peripheral 20 via the server communication unit 63. The flow control unit 64 reads the selected work flow information from the work flow storing unit 62 and performs the work flow information. At the same time, the flow control unit 64 transmits the work flow information read from the work flow storing unit 62 to the multifunction peripheral 20 via the server communication unit 63. The flow control unit 64 exchanges the data to be processed with the multifunction peripheral 20 via the server communication unit 63 and causes the task performing unit 61 to perform the task for which the work flow information defines the work flow server 30 as the host device.

The multifunction peripheral 20 includes a task performing unit 61, a flow control unit 64, a multifunction peripheral communication unit 65, a login unit 66, a work flow selecting unit 67, a function performing unit 68, and a function control unit 69.

The task performing unit 61 and the flow control unit 64 have functions and configurations identical to those of the task performing unit 61 and the flow control unit 64 included in the work flow server 30. The flow control unit 64 of the multifunction peripheral 20, however, acquires the work flow information from the work flow server 30 via the multifunction peripheral communication unit 65.

The task performing unit 61 of the multifunction peripheral 20 may perform tasks different in specific details from those performed by the task performing unit 61 of the work flow server 30. Specifically, types of plug-in programs different from those for the task performing unit 61 of the work flow server 30 may be registered for the task performing unit 61 of the multifunction peripheral 20. At least a connection task plug-in program is, however, registered in advance for the task performing unit 61 of the multifunction peripheral 20 and the task performing unit 61 of the multifunction peripheral 20 can perform the connection task to be described in detail with reference to FIG. 20 by the calling up of the connection task plug-in program.

The multifunction peripheral communication unit 65 communicates with the work flow server 30 via the network 40. The login unit 66 accepts login information based on an operation performed by the user. The work flow selecting unit 67 displays a list of work flows that can be selected and selects a specific work flow to be performed based on the operation by the user.

The function performing unit 68 performs functions the multifunction peripheral 20 uniquely has. The function performing unit 68 exemplarily includes a scanning unit 81, a printing unit 82, a facsimile unit 83, and a display input unit 84.

The scanning unit 81 scans a sheet placed on a platen to thereby capture image data. The printing unit 82 prints an image or the like on a sheet. The facsimile unit 83 performs facsimile transmission and reception via a telephone line. The display input unit 84 displays information for the user and inputs operating information from the user.

The function control unit 69 controls the functions performed by the function performing unit 68. When the work flow information defines a task to be performed by the function performing unit 68, the function control unit 69 causes the function performing unit 68 to perform the task in response to a call-up from the flow control unit 64.

Figure 17:
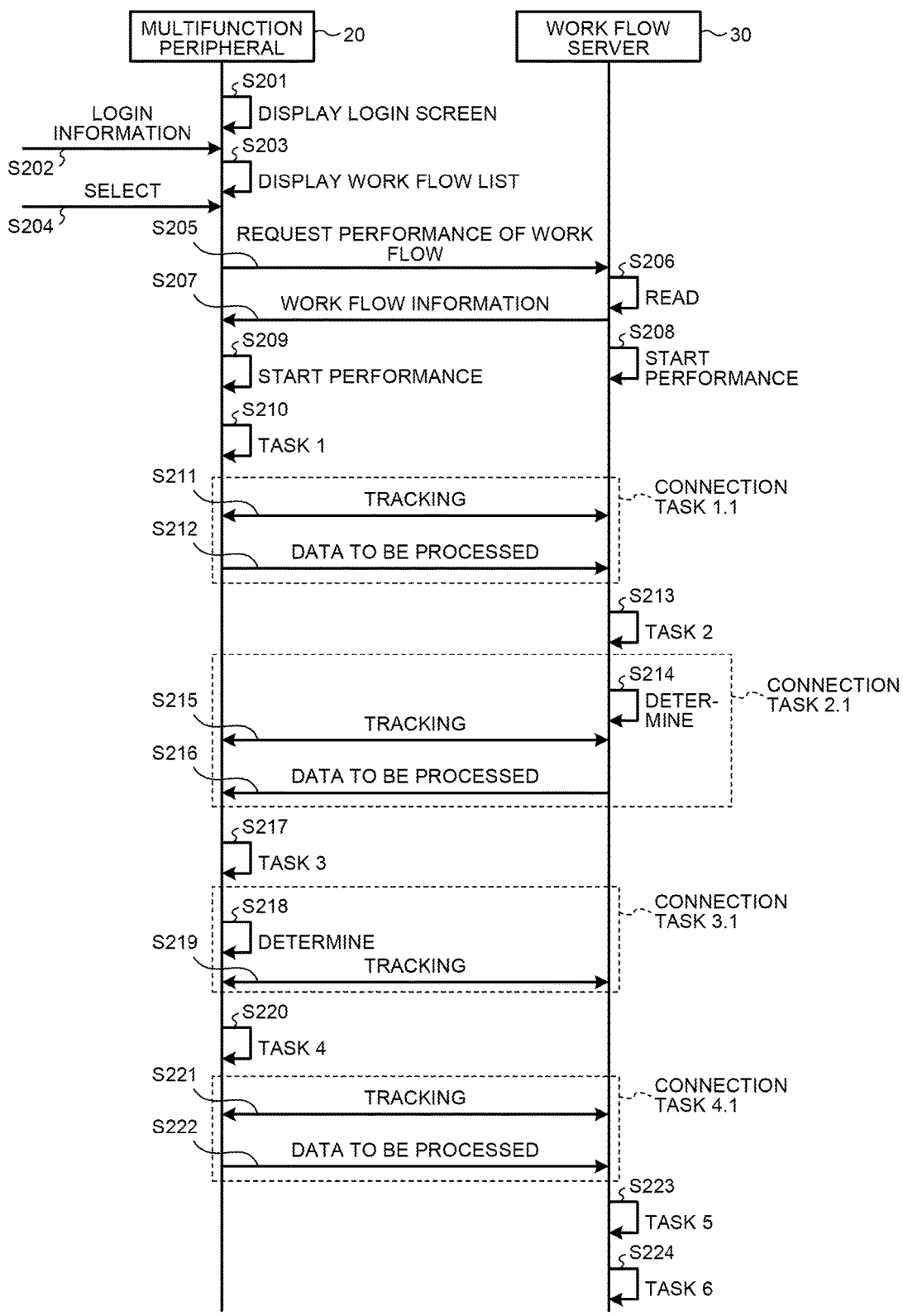
FIG. 17 is diagram illustrating a sequence when the work flow information illustrated in FIG. 15 is performed.

FIG. 17 is a sequence diagram when the work flow information illustrated in FIG. 15 is performed. When performing the work flow information illustrated in FIG. 15, the multifunction peripheral 20 and the work flow server 30 follow steps in sequence as illustrated in FIG. 17.

At step S201, the multifunction peripheral 20 displays a login screen for the user. For example, the multifunction peripheral 20 displays a login screen that accepts inputs of a user name and a password as illustrated in FIG. 18.

At step 3202, the multifunction peripheral 20 accepts login information and performs an authentication procedure. For example, the multifunction peripheral 20 transmits authentication information to an authentication server or the like disposed on the network 40 to thereby request the authentication server for the authentication. When the authentication is successful, the multifunction peripheral 20 then performs step S203.

At step S203, the multifunction peripheral 20 acquires from the work flow server 30 a list of work flows that can be performed and displays the acquired list. For example, the multifunction peripheral 20 displays a list as that illustrated in FIG. 19.

At step S204, the multifunction peripheral 20 accepts a selection of the work flow from the user. Then, at step S205, the multifunction peripheral 20 transmits a request for performing the selected work flow to the work flow server 30.

At step S206, the work flow server 30, having received the request for performing the work flow, reads the work flow information specified in the received request. Then, at step S207, the work flow server 30 transmits the read work flow information to the multifunction peripheral 20.

At steps S208 and S209, the multifunction peripheral 20 and the work flow server 30 each starts performing the work flow according to the read work flow information.

Each of the multifunction peripheral 20 and the work flow server 30, if it is the host device for performing the first task specified in the work flow information, starts performing the first task of the work flow information. In contrast, if it is not the host device for performing the first task specified in the work flow information, each of the multifunction peripheral 20 and the work flow server 30 performs the first connection task specified in the work flow information.

Thus, if the work flow information is as illustrated in FIG. 15, the multifunction peripheral 20 starts performing the work flow information with task 1. The work flow server 30 starts performing the work flow information with connection task 1.1.

At step S210, the multifunction peripheral 20 performs task 1. The multifunction peripheral 20 and the work flow server 30 then perform connection task 1.1.

In connection task 1.1, the multifunction peripheral 20 and the work flow server 30 communicate with each other to perform tracking at step S211. In the tracking, the multifunction peripheral 20 and the work flow server 30 synchronize positions of the tasks within the work flow. Then, at step S212, the multifunction peripheral 20 transmits the data to be processed as a result of the performance of task 1 to the work flow server 30.

When the performance of step S212 is completed, the host device is changed to the work flow server 30, so that the multifunction peripheral 20 performs connection task 2.1 that follows in the work flow information. Meanwhile, the work flow server 30 is the host device when the performance of step S212 is completed and the work flow server 30 performs task 2 that follows in the work flow information.

At step S213, the work flow server 30 performs task 2. Then, the multifunction peripheral 20 and the work flow server 30 perform connection task 2.1.

In connection task 2.1, the work flow server 30 as the host device determines, at step S214, whether task 3 is to be performed by the multifunction peripheral 20 or the work flow server 30 according to a predetermined determination condition. A specific example of the predetermined determination condition will be described later after the description of this work flow. Assume here that the work flow server 30 determines that the multifunction peripheral 20 is the host device for task 3.

Then at step S215, the multifunction peripheral 20 and the work flow server 30 communicate with each other to perform tracking. The multifunction peripheral 20 and the work flow server 30 synchronize positions of the tasks within the work flow in the tracking. At the same time during this tracking, the multifunction peripheral 20 acquires the result of the determination made by the work flow server 30. The host device is changed as a result of the determination and, at step S216, the work flow server 30 transmits the data to be processed as the result of task 2 to the multifunction peripheral 20. When step 3216 is completed, the host device is changed to the multifunction peripheral 20, so that the work flow server 30 performs connection task 3.1 that follows in the work flow information. Meanwhile, the multifunction peripheral 20 is the host device when step S216 is completed and the multifunction peripheral 20 performs task 3 that follows in the work flow information.

At step S217, the multifunction peripheral 20 performs task 3. Then, the multifunction peripheral 20 and the work flow server 30 perform connection task 3.1.

In connection task 3.1, the multifunction peripheral 20 as the host device determines, at step S218, whether task 4 is to be performed by the multifunction peripheral 20 or the work flow server 30 according to a predetermined determination condition. Assume here that the multifunction peripheral 20 determines that the multifunction peripheral 20 is the host device for task 4.

Then at step S219, the multifunction peripheral 20 and the work flow server 30 communicate with each other to perform tracking. The multifunction peripheral 20 and the work flow server 30 synchronize positions of the tasks within the work flow in the tracking. At the same time during this tracking, the work flow server 30 acquires the result of the determination made by the multifunction peripheral 20.

The host devices do not change as a result of the determination. When the performance of step S219 is completed, the work flow server 30 performs connection task 4.1 that follows in the work flow information. Because the host devices do not change as a result of the determination, the multifunction peripheral 20 performs task 4 that follows in the work flow information without transmitting the data to be processed as the result of task 3 to the work flow server 30.

At step S220, the multifunction peripheral 20 performs task 4. Then, the multifunction peripheral 20 and the work flow server 30 perform connection task 4.1.

In connection task 4.1, at step S221, the multifunction peripheral 20 and the work flow server 30 communicate with each other to perform tracking. The multifunction peripheral 20 and the work flow server 30 synchronize positions of the tasks within the work flow in the tracking. Then, at step S222, the multifunction peripheral 20 transmits the data to be processed as the result of the performance of task 4 to the work flow server 30.

Upon completing step S222, the multifunction peripheral 20 terminates the work flow according to the work flow information, because the host device has been changed to the work flow server 30 and no connection task is specified thereafter in the work flow information. Upon completing performing step S222, the work flow server 30 is the host device and performs task 5 that follows in the work flow information.

At step S223, the work flow server 30 performs task 5. Then at step S224, the work flow server 30 performs task 6. When the performance of step S224 is completed, no further task is specified in the work flow information, so that the multifunction peripheral 20 terminates the performance of the work flow according to the work flow information.

As described above, the multifunction peripheral 20 and the work flow server 30 can cooperate with each other to perform sequentially the tasks defined in the work flow information.

When the work flow information defines that a task is to be performed by one information processing apparatus selected from the multifunction peripheral 20 and the work flow server 30, such one information processing apparatus is selected, for example, according to the following determination condition.

For example, when a plurality of multifunction peripherals 20 are connected to the network 40, the administrator may classify the multifunction peripherals 20 into groups in advance. Then in the connection task, the multifunction peripheral 20 or the work flow server 30 determines whether or not the multifunction peripheral 20 belongs to a predetermined group and, if the multifunction peripheral 20 belongs to the predetermined group, the multifunction peripheral 20 is the host device and, if the multifunction peripheral 20 does not belong to the predetermined group, the work flow server 30 is the host device.

The administrator may, for example, group the multifunction peripherals 20 according to a communication speed. In this case, in the connection task, if the multifunction peripheral 20 belongs, for example, to a group having a fast communication speed, the multifunction peripheral 20 or the work flow server 30 defines the multifunction peripheral 20 as the host device; if the multifunction peripheral 20 does not belong to the group having a fast communication speed, the multifunction peripheral 20 or the work flow server 30 defines the work flow server 30 as the host device. This allows the multifunction peripheral 20 or the work flow server 30 to select the host device for the subsequent task based on the communication speed.

Instead of the administrator's setting the groups of the multifunction peripherals 20 according to the communication speed, the administrative server 31 or other device may dynamically set the groups. For example, the administrative server 31 may transmit a test packet to each of the multifunction peripherals 20 to thereby group the multifunction peripherals 20 according to measurements of a network time distance. The administrative server 31 may transmit the test packet at regular intervals to thereby change the grouping. The administrative server 31 may calculate statistics of the network time distances corresponding to the time zone and, based on the calculated statistics, change the grouping. The administrative server 31 may, instead of transmitting the test packet, measure and historically record network speeds during actual access to thereby change the grouping.

The multifunction peripheral 20 or the work flow server 30 may select the host device for the subsequent task based on a load factor of a processor of the multifunction peripheral 20 or a load factor of a processor of the work flow server 30. For example, if the load factor of the processor of the multifunction peripheral 20 is lower than a predetermined threshold value, the multifunction peripheral 20 or the work flow server 30 defines the multifunction peripheral 20 as the host device. If the load factor of the processor of the work flow server 30 is lower than a predetermined threshold value, the multifunction peripheral 20 or the work flow server 30 defines the work flow server 30 as the host device. This enables the multifunction peripheral 20 and the work flow server 30 to effectively utilize a resource having a low load factor, thereby performing the task efficiently.

Alternatively, the multifunction peripheral 20 or the work flow server 30 may select the host device for the subsequent task based on a volume of the data to be processed. For example, if the volume of the data to be processed is smaller than a predetermined threshold value, the multifunction peripheral 20 or the work flow server 30 defines the multifunction peripheral 20 as the host device. This allows the multifunction peripheral 20 and the work flow server 30 to cause the multifunction peripheral 20 to perform a relatively light load task and the work flow server 30 to perform a relatively heavy load task.

If the multifunction peripheral 20 or the work flow server 30, whichever is the host device, is unable to communicate with the other in the connection task, the multifunction peripheral 20 or the work flow server 30 may not need to change the host devices for the subsequent task. Specifically, assume a condition in which a plurality of tasks are being performed by a first information processing apparatus and a second information processing apparatus. Under this condition, if the first information processing apparatus is unable to communicate with the second information processing apparatus, the first information processing apparatus is defined as the host device for the subsequent task in the connection task. The tasks can be consecutively performed even when the first information processing apparatus and the second information processing apparatus are unable to communicate with each other.

Figure 20:
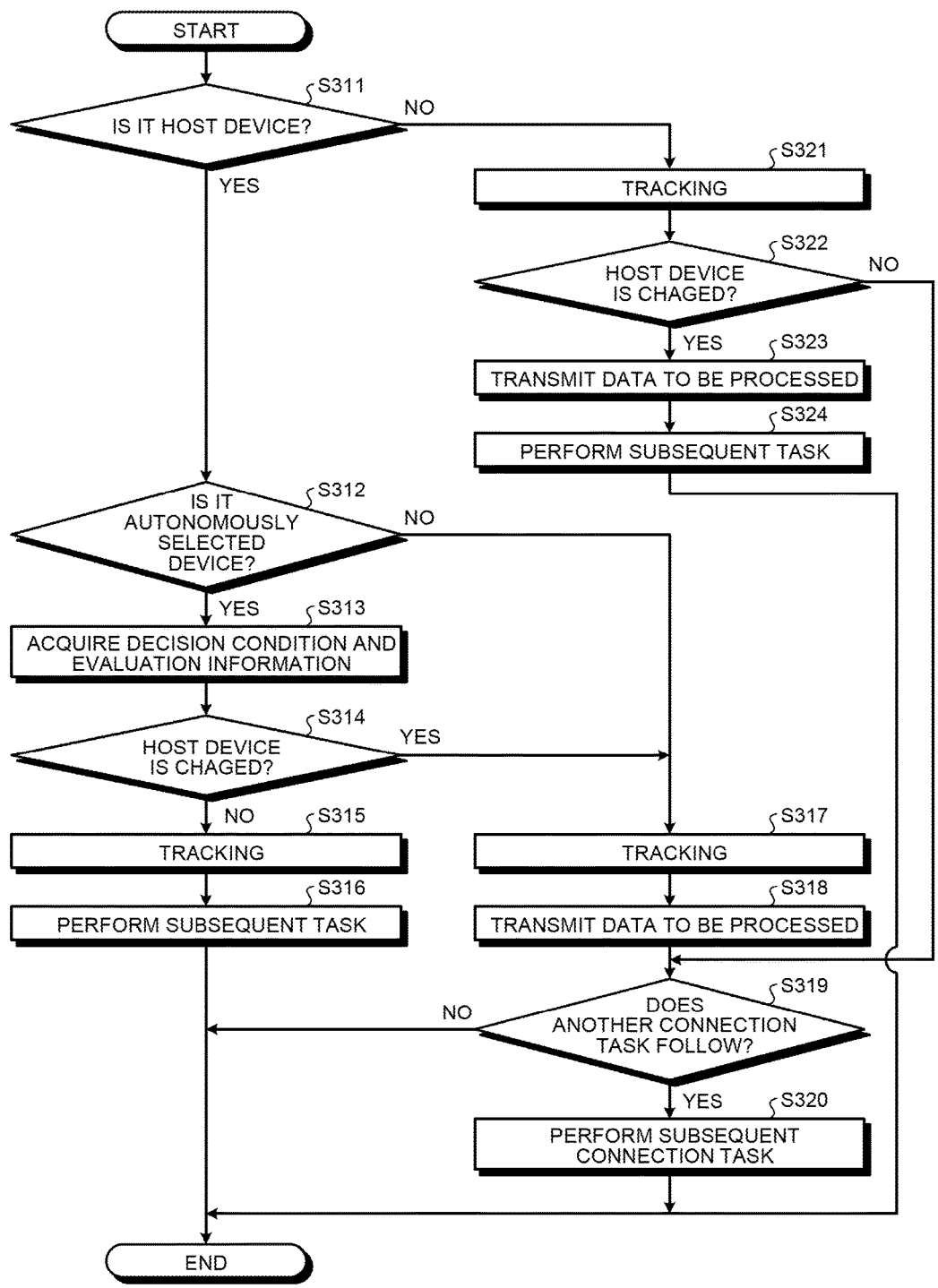
FIG. 20 is a flowchart illustrating a connection task.

FIG. 20 is a flowchart illustrating the connection task. The multifunction peripheral 20 and the work flow server 30 each perform steps illustrated in FIG. 20 in the connection task. The following describes the steps performed by the multifunction peripheral 20; nonetheless, the work flow server 30 performs the similar steps.

At step S311, it is determined whether or not the multifunction peripheral 20 was the host device for the immediately preceding task. If it is determined that the multifunction peripheral 20 was the host device for the immediately preceding task (Yes at step S311), step S312 is then performed.

At step S312, the multifunction peripheral 20 determines whether or not the work flow information defines the autonomously selected device as the host device for the subsequent task. Specifically, the multifunction peripheral 20 determines whether the subsequent task is to be performed by the multifunction peripheral 20 or the work flow server 30 whichever is selected according to a predetermined determination condition. If the subsequent task is to be performed by the multifunction peripheral 20 or the work flow server 30 whichever is selected according to a predetermined determination condition (Yes at step S312), the multifunction peripheral 20 then performs step S313. If the subsequent task is not to be performed by the multifunction peripheral 20 or the work flow server 30 whichever is selected according to a predetermined determination condition, specifically, if the work flow server 30 is the host device for the subsequent task (No at step S312), the multifunction peripheral 20 performs step S317.

Then at step S313, the multifunction peripheral 20 acquires the determination condition and evaluation information. Exemplarily, the multifunction peripheral 20 acquires the determination condition and the evaluation information that may, for example, be the group to which the multifunction peripheral 20 belongs, the communication speed of the multifunction peripheral 20, the load factor of the processor of the multifunction peripheral 20 or the work flow server 30, or the volume of the data to be processed.

At step S314, the work flow server 30 determines whether the multifunction peripheral 20 or the work flow server 30 is the host device based on the acquired determination condition and the evaluation condition. If the host device is changed as a result of the determination (Yes at S314), the multifunction peripheral 20 performs step S317. If the host devices do not change as a result of the determination (No at S314), the multifunction peripheral 20 performs step S315.

At step S315, the multifunction peripheral 20 communicates with the work flow server 30 to perform tracking. In this tracking, the multifunction peripheral 20 and the work flow server 30 synchronize positions of the tasks within the work flow, while at the same time, the multifunction peripheral 20 notifies the work flow server 30 that the host devices do not change.

Then at step S316, the multifunction peripheral 20 performs the subsequent step in the work flow information. Upon completing performing step S316, the multifunction peripheral 20 terminates the current connection task.

At step S317, the multifunction peripheral 20 communicates with the work flow server 30 to perform tracking. In this tracking, the multifunction peripheral 20 and the work flow server 30 synchronize positions of the tasks within the work flow, while at the same time, the multifunction peripheral 20 notifies the work flow server 30 that the host device is changed to the work flow server 30.

At step S318, the multifunction peripheral 20 transmits the data to be processed to the work flow server 30.

At step S319, the multifunction peripheral 20 analyzes the work flow information to thereby determine whether or not another connection task exists following the current connection task. Specifically, the multifunction peripheral 20 determines whether or not the multifunction peripheral 20 is likely to be the host device in subsequent tasks. If no more connection tasks follow (No at step S319), the multifunction peripheral 20 terminates the work flow because the multifunction peripheral 20 has no more tasks to perform according to the work flow information.

If another connection task follows (Yes at step S319), the multifunction peripheral 20, being likely to perform a task according to the work flow information thereafter, performs step S320. At step S320, the multifunction peripheral 20 performs the subsequent connection task in the work flow information. Upon completing performing step S320, the multifunction peripheral 20 terminates the current connection task.

Meanwhile, if it is determined that the multifunction peripheral 20 was not the host device for the immediately preceding task (No at step S311), the multifunction peripheral 20 performs step S321.

At step S321, the multifunction peripheral 20 communicates with the work flow server 30 to perform tracking. In this tracking, the multifunction peripheral 20 waits until the work flow server 30 performs the corresponding connection task, thereby synchronizing positions of the tasks within the work flow with the work flow server 30. Additionally, in this tracking, the multifunction peripheral 20 receives from the work flow server 30 information as to whether or not the host device is changed.

At step S322, if the host devices do not change (No at step S322) as a result of the tracking, the multifunction peripheral 20 performs step S319. The multifunction peripheral 20 then determines whether or not another connection task follows (step S319). If no more connection task follows (No at step S319), the multifunction peripheral 20 terminates the work flow, whereas if another connection task follows (Yes at step S319), the multifunction peripheral 20 performs the subsequent connection task (step S320).

If the host device is changed (Yes at step S322) as a result of the tracking, the multifunction peripheral 20 performs step S323. At step S323, the multifunction peripheral 20 receives the data to be processed from the work flow server 30. Then at step S324, the multifunction peripheral 20 performs the subsequent task in the work flow information. Upon completing performing step S324, the multifunction peripheral 20 terminates the current connection task.

As described heretofore, the information processing system 10 according to the embodiment enables a plurality of tasks defined by the work flow information to be performed efficiently through cooperation among a plurality of information processing apparatuses (e.g., the multifunction peripheral 20 and the work flow server 30). In addition, the information processing system 10 according to the embodiment allows a single task to be performed by one information processing apparatus selected from a plurality of information processing apparatuses according to a predetermined determination condition. This enables the information processing system 10 to perform a work flow with an even higher degree of freedom.

Figure 21:
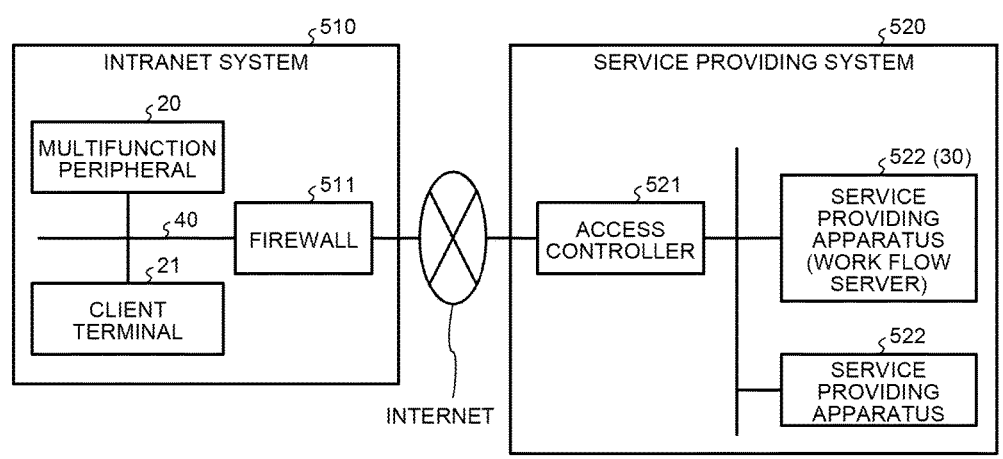
FIG. 21 is a diagram illustrating a configuration of the information processing system according to the embodiment applied to a cloud system.

FIG. 21 illustrates a configuration of the information processing system 10 according to the embodiment applied to a cloud system 500.

The information processing system 10 according to the embodiment may be applied to the cloud system 500. The cloud system 500 exemplarily includes an intranet system 510 and a service providing system 520. The intranet system 510 and the service providing system 520 are connected to each other via the Internet.

In the intranet system 510, the multifunction peripheral 20, the client terminal 21, and the like are connected to each other via the network 40. Additionally, each of the devices within the intranet system 510 is connected to, for example, an external server via a firewall 511. Thus, the multifunction peripheral 20 and other devices can access the external server and the like, but are not accessed directly by the external server and the like.

The service providing system 520 includes a plurality of service providing apparatuses 522. The service providing apparatuses 522 may include a plurality of information processing apparatuses. Alternatively, a single information processing apparatus may serve as the service providing apparatuses 522.

One service providing apparatus 522 provides the multifunction peripheral 20 and other devices in the intranet system 510 with the functions of the work flow server 30 in the information processing system 10.

An access controller 521 performs authentication for the multifunction peripheral 20 or other device in the intranet system 510 to access the service providing system 520. A code, for example, called an organization code assigned to each business is used for the authentication to the service providing system 520. When successfully authenticated by the access controller 521, each device in the intranet system 510 can access each of the service providing apparatuses 522.

A cloud system such as the cloud system 500 as described above eliminates the need for a work flow server 30 within the intranet system 510. The functions of the work flow server 30 can thus be achieved without needing to install an expensive server or the like.

Figure 22:
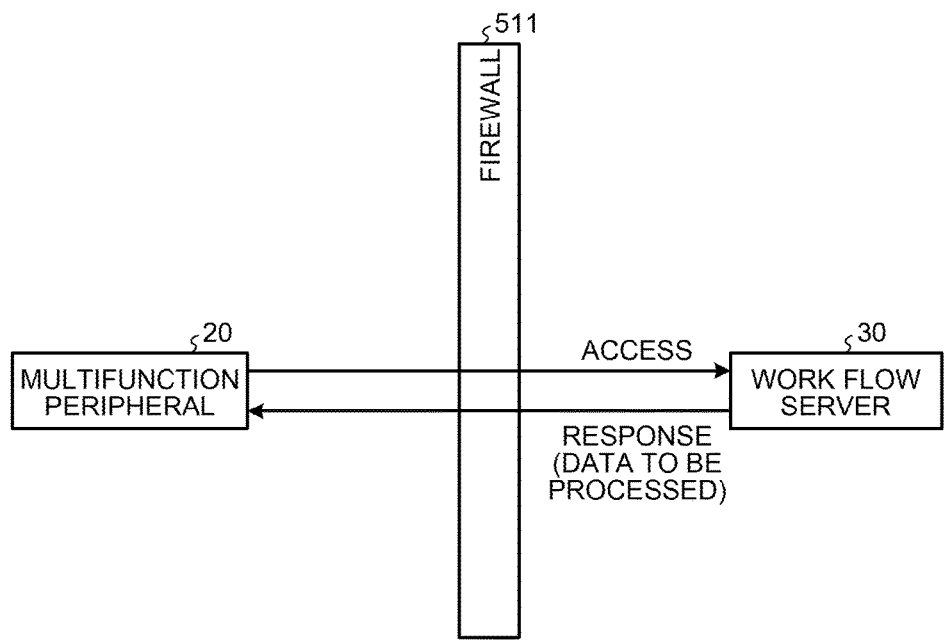
FIG. 22 is a diagram illustrating exemplary exchanges of data between the multifunction peripheral and the work flow server in the cloud system.

FIG. 22 illustrates exemplary exchanges of data between the multifunction peripheral 20 and the work flow server 30 in the cloud system 500.

In this cloud system 500, because of the firewall 511, it is difficult for the work flow server 30 to access the multifunction peripheral 20, although the multifunction peripheral 20 can access the work flow server 30.

Thus, to transmit, for example, the data to be processed from the work flow server 30 to the multifunction peripheral 20 in the cloud system 500, the data to be processed is included in a response to the access from the multifunction peripheral 20 to the work flow server 30. For example, in the cloud system 500, the multifunction peripheral 20 invariably accesses the work flow server 30 in the tracking and the transmission of the data to be processed in the connection task. This enables the multifunction peripheral 20 and the work flow server 30 to transmit and receive necessary data in the connection task even with the presence of the firewall 511.

The information processing apparatus according to the embodiment (e.g., the multifunction peripheral 20 and the work flow server 30) has a hardware configuration using ordinary computers, including a control unit such as a CPU, a storage unit such as a read only memory (ROM) and a RAM, an external storage unit such as a HDD and a CD drive, a display unit such as a display, and an input device such as a keyboard and a mouse.

The program executed by the information processing apparatus according to the embodiment is provided by being recorded in a computer-readable recording medium such as a CD-ROM, a flexible disk (FD), a CD-R, and a digital versatile disc (DVD), as an installable or executable file.

The program executed by the information processing apparatus according to the embodiment may still be configured so as to be stored in a computer connected to a network, such as the Internet, and to be downloaded via the network. The program executed by the information processing apparatus according to the embodiment may still be provided or distributed via a network, such as the Internet. Furthermore, the program according to the embodiment may even be provided by being previously incorporated in, for example, a ROM.

The program executed by the information processing apparatus according to the embodiment has a modular configuration including the above-described functional units (the task performing unit 61 and the flow control unit 64). Each functional unit is generated as actual hardware on a main storage as a result of the CPU (processor) loading the program from the storage medium and executing the loaded program to thereby generate the task performing unit 61 and the flow control unit 64 on the main storage.

The present invention enables a plurality of information processing apparatuses to cooperate with each other to efficiently perform a plurality of tasks defined by work flow information.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing method implemented by an information processing system including a first information processing apparatus including a first processor and a second information processing apparatus including a second processor, and a terminal apparatus including a third processor, comprising:
    displaying a setting screen for defining a workflow implementing a plurality of processes in a set order in a logic flow area of the setting screen;
    setting a plurality of defined processes and the order of executing the defined processes via the setting screen;
    setting, with respect to each of the defined processes, a host device of a selected process from among the first information processing apparatus and the second information processing apparatus in a physical flow area of the setting screen;
    creating a work flow information further defining the defined processes, order of executing the defined processes, and the host device by connecting task icons with an arrow indicating an order of performance and connecting the task icons disposed in the logic flow area with host device icons disposed in the physical flow area with a line so as to associate the task icons and the host device icons with each other; and
    acquiring data of a target process to be executed according to the work flow information so as to start the process of the work flow information,
    determining, based on a host device of each defined process further defined with the work flow information stored in a storage, a respective defined process to be executed by one of the first processor and the second processor from among defined processes further defined with the work flow information, and
    executing the respective defined process determined to be executed by one of the first processor and the second processor, respectively.

2. The information processing method implemented by an information processing system including a first information processing apparatus and a second information processing apparatus, and a terminal apparatus as recited in claim 1, wherein the connecting task icons is automatic when only one host device can perform the processes.

3. An information processing system, comprising:
a first information processing apparatus including a first processor;
a second information processing apparatus including a second processor; and
a terminal apparatus including a third processor, the third processor configured to:
- display a setting screen for defining a work flow implementing a plurality of processes in a set order in a logic flow area of the setting screen,
- set a plurality of defined processes and the order of executing the defined processes via the setting screen, and
- set, with respect to each of the defined processes, a host device of a selected process, from among the first information processing apparatus and the second information processing apparatus in a physical flow area of the setting screen, wherein:

the second processor is configured to create work flow information further defining the defined processes, order of executing the defined processes, and the host device by connecting task icons with an arrow indicating an order of performance and connecting the task icons disposed in the logic flow area with host device icons disposed in the physical flow area with a line so as to associate the task icons and the host device icons with each other, the second information processing apparatus further includes a storage, and the second processor is further configured to cause the storage to store therein the created work flow information of one or more of the work flows, the first processor is configured to acquire data of a target process to be executed according to the work flow information so as to start the process of the work flow information, each of the first processor and the second processor is configured to determine, based on a host device of each defined process further defined with the work flow information stored in the storage, a respective defined process to be executed by itself from among defined processes further defined with the work flow information, and each of the first processor and the second processor is configured to execute the respective defined process determined to be executed by each of the first processor and the second processor, respectively.

4. The information processing system according to claim 3, wherein
each of the first processor and the second processor are further configured to
perform tasks defined in the work flow information; and
perform a task for which the information processing apparatus is the host device.

5. The information processing system according to claim 3, wherein
the work flow information includes a connection task between a task performed by the first information processing apparatus as the host device and a task performed by the second information processing apparatus as the host device, and
in the connection task, the first processor is further configured to transmit data to be processed to the second processor to thereby set the second information processing apparatus as the host device for a subsequent task.

6. The information processing system according to claim 5, wherein
in the connection task, when a subsequent connection task for which the host device is likely to be returned to the first information processing apparatus follows, the first processor is configured to perform the subsequent connection task, and
when the host device is the second information processing apparatus, the first processor is configured to receive information from the second processor whether or not the host device is changed to the first information processing apparatus, whereas when the host device is changed to the first information processing apparatus, the first processor is configured to receive the data to be processed from the second processor.

7. An information processing system as recited in claim 5, wherein each of the first information processing apparatus and the second information processing apparatus synchronizes portions of the processes within the work flow with the terminal apparatus.

8. The information processing system according to claim 3, wherein
the work flow information has a connection task inserted between a task performed by the processor of the first information processing apparatus as the host device and a task performed by a processor of one information processing apparatus selected from the first information processing apparatus and the second information processing apparatus as the host device, and
in the connection task, the first processor is configured to select one information processing apparatus according to a set determination condition, and
when the host device for a subsequent task is a new one as a result of the selection, the first processor is configured to transmit data to be processed to the second processor to thereby set the second information processing apparatus as the host device for the subsequent task, and when the host device for the subsequent task is not a new one as a result of the selection, the first processor is configured to perform the subsequent task.

9. The information processing system according to claim 8, wherein
when two or more tasks are consecutive, each of the tasks being performed by, as the host device, the processor of the one information processing apparatus selected from the first information processing apparatus and the second information processing apparatus, the work flow information has the connection task inserted before each of the two or more consecutive tasks.

10. The information processing system according to claim 8, wherein
when two or more tasks are consecutive, each of the tasks being performed by, as the host device, the processor of the one information processing apparatus selected from the first information processing apparatus and the second information processing apparatus, the work flow information has the connection task inserted before a starting task of the two or more consecutive tasks, and
each of the first processor and the second processor is configured to set the host device for all of the two or more consecutive tasks other than the starting task identical to the host device for the starting task.

11. The information processing system according to claim 8, wherein,
in the connection task, the first processor, when unable to communicate with the second processor, is configured to set the first information processing apparatus as the host device for a subsequent task.

12. The information processing system according to claim 8, wherein,
in the connection task, the first processor is configured to select an information processing apparatus that belongs to a predetermined group as the host device for a subsequent task.

13. The information processing system according to claim 8, wherein,
in the connection task, the first processor is configured to select an information processing apparatus as the host device for a subsequent task based on a communication speed.

14. The information processing system according to claim 8, wherein,
in the connection task, the first processor is configured to select an information processing apparatus as the host device for a subsequent task based on a load factor of a processor within the selected information processing apparatus.

15. The information processing system according to claim 8, is configured to select,
in the connection task, the first processor is configured to select an information processing apparatus as the host device for a subsequent task based on a volume of data to be processed.

16. An information processing system as recited in claim 3, wherein the connecting task icons is automatic when only one host device can perform the processes.

17. A non-transitory recording medium storing program codes that cause, when executed by a processor, to perform an information processing method, comprising:
displaying a setting screen for defining a workflow implementing a plurality of processes in a set order in a logic flow area of the setting screen;
setting a plurality of defined processes and the order of executing the defined processes via the setting screen;
setting, with respect to each of the defined processes, a host device of a selected process, from among a first information processing apparatus having a first processor, and a second information processing apparatus, having a second processor, in a physical flow area of the setting screen;
creating a work flow information further defining the defined processes, order of executing the defined processes, and the host device by connecting task icons with an arrow indicating an order of performance and connecting the task icons disposed in the logic flow area with host device icons disposed in the physical flow area with a line so as to associate the task icons and the host device icons with each other; and
acquiring data of a target process to be executed according to the work flow information so as to start the process of the work flow information,
determining, based on a host device of each defined process further defined with the work flow information stored in a storage, a respective defined process to be executed by one of the first processor and the second processor from among defined processes further defined with the work flow information, and
executing the respective defined process determined to be executed by one of the first processor and the second processor, respectively.

18. A non-transitory recording medium storing program codes that cause, when executed by a processor, to perform an information processing method, as recited in claim 17, wherein the connecting task icons is automatic when only one host device can perform the processes.

* * * * *